United States Patent
Baker et al.

(10) Patent No.: US 11,752,933 B2
(45) Date of Patent: Sep. 12, 2023

(54) ACCESSORY OPTICAL PATH TRANSLATOR

(71) Applicant: Emergency Technology, Inc., Hudsonville, MI (US)

(72) Inventors: Douglas V. Baker, Hudsonville, MI (US); Bradley D. Miller, Hudsonville, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 0 days.

(21) Appl. No.: 17/548,053

(22) Filed: Dec. 10, 2021

(65) Prior Publication Data

US 2022/0185177 A1 Jun. 16, 2022

Related U.S. Application Data

(60) Provisional application No. 63/124,380, filed on Dec. 11, 2020.

(51) Int. Cl.
*B60Q 3/208* (2017.01)
*B60Q 3/80* (2017.01)
*B60Q 3/60* (2017.01)

(52) U.S. Cl.
CPC .............. *B60Q 3/208* (2017.02); *B60Q 3/60* (2017.02); *B60Q 3/80* (2017.02)

(58) Field of Classification Search
CPC ............ B60Q 3/208; B60Q 3/60; B60Q 3/80
See application file for complete search history.

(56) References Cited

U.S. PATENT DOCUMENTS

| 9,285,531 B2 | 3/2016 | Sherman et al. |
| 9,664,847 B2 | 5/2017 | Krenn et al. |
| 10,173,582 B2 | 1/2019 | Salter et al. |
| 10,227,034 B2 | 3/2019 | Litke et al. |
| 10,571,690 B2 | 2/2020 | Ellis |
| 2014/0369059 A1* | 12/2014 | Barton .................. B60Q 1/302 362/545 |
| 2015/0138817 A1* | 5/2015 | Salter .................... F21S 41/176 362/510 |
| 2019/0160923 A1 | 5/2019 | Gardner et al. |

FOREIGN PATENT DOCUMENTS

WO     2009/024597     2/2009

* cited by examiner

*Primary Examiner* — Thomas M Sember
(74) *Attorney, Agent, or Firm* — Warner Norcross + Judd LLP

(57) ABSTRACT

A lighting system for specialty lighting, which may be attached to a motor vehicle with a window (e.g., glass, plastic, etc.) that is light transmissive. The lighting system may include one or more light assemblies attached to the window in an interior of the vehicle. The lighting system may include an optical path translator to direct the light emitted out the window of the vehicle and limit the amount of light reflected into the cabin of the vehicle. The lighting system may provide concealed electrical connections for power, signal, and data, as well as concealment for one or more additional aspects of the lighting system.

22 Claims, 18 Drawing Sheets

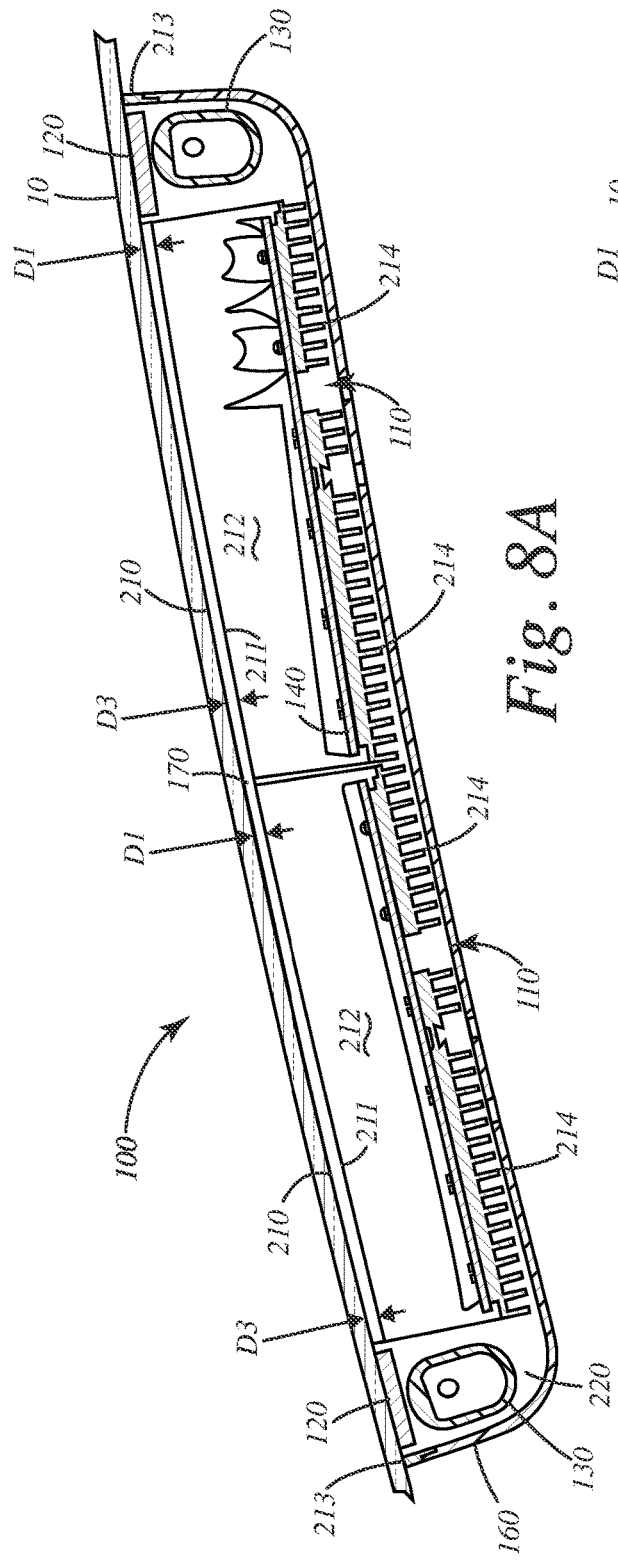
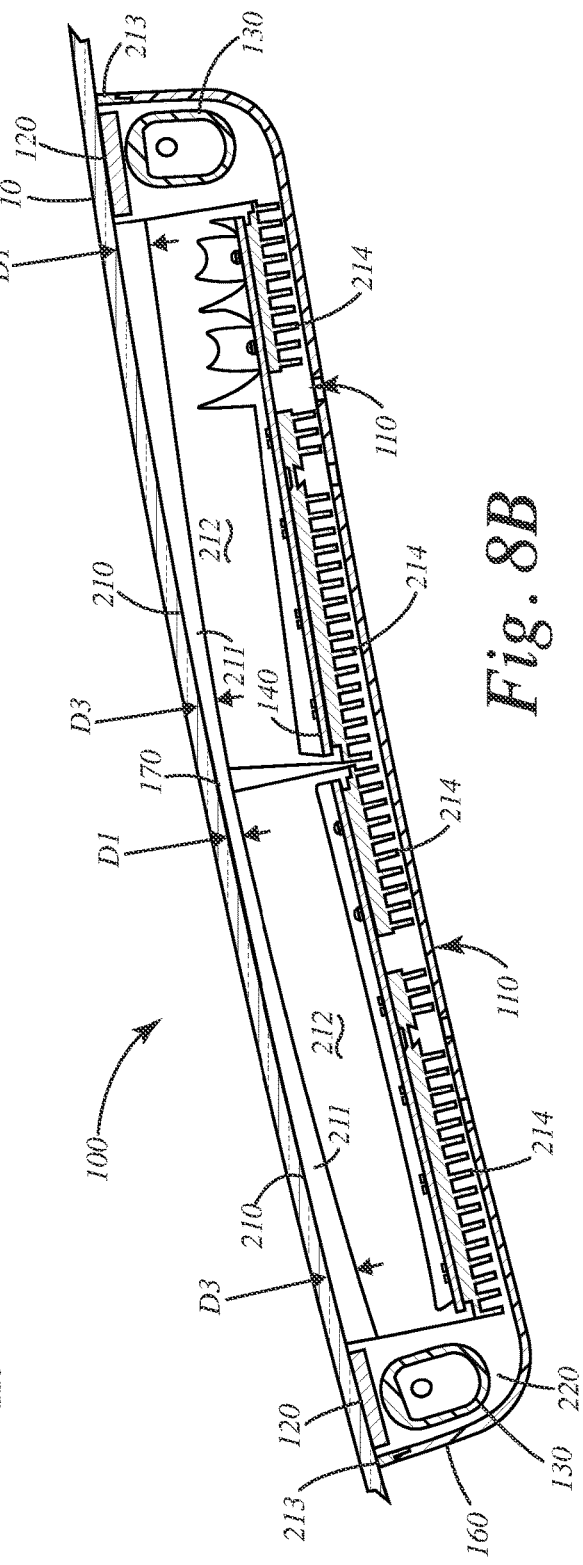
Fig. 8A
Fig. 8B

ACCESSORY OPTICAL PATH TRANSLATOR

TECHNICAL FIELD

The present application relates to lighting, and more particularly to specialty lighting that may be disposed on the interior of a motor vehicle.

BACKGROUND

Many specialty vehicles are fitted with conventional lighting assemblies for a variety of reasons—although the principal reason in many cases is signaling. For instance, in the context of a specialty vehicle for police also known as a police vehicle, conventional lighting assemblies may be incorporated in both the exterior and interior of the vehicle to provide signaling capabilities, scene lighting, or messaging. Another specialty vehicle category may include hybrid and electric vehicles with a focus on having the lower aerodynamic drag to improve range while also providing highly efficient and attractive lighting options.

While in an inactivated state, external lights may be more easily seen than internal lights by an observer. As a result, many times, efforts have been made to incorporate lights into the vehicle cabin to make the police vehicle less conspicuous. In these cases, consideration is often provided for placement of the lighting assembly to enhance safety or avoid unnecessary distraction. For instance, the lighting assembly may be positioned to substantially avoid an impact zone, to reduce driver vision obstruction and distraction, or to prevent a substantial amount of light from being directed into the vehicle cabin. Vehicle cabin lights may also reduce aerodynamic drag and enhance fuel economy relative to conventional externally mounted lighting systems.

Specialty vehicles are often not owned outright and are instead leased for a specialty purpose for a period of time. However, the leased vehicle is typically not configured for the specialty purpose. Modifications are made to the leased vehicle so that it can perform according to the specialty purpose, such as a police vehicle. These modifications can physically alter the leased vehicle, meaning that, at the end of the lease, repair efforts must be made to substantially return the vehicle to its original state at the time of lease (if called for in the lease agreement).

In some instances, there is a preference for use of internal lights over external lights. Installation of internal lights can avoid routing of wire from within a vehicle cabin to an exterior of the vehicle cabin. Wiring for an internal light may be routed within the vehicle cabin, whereas wiring for an external light may utilize a hole through the forward firewall of the vehicle cabin. Such a hole would likely need to be filled or sealed after removal of the external light at the end of the lease period for the vehicle.

In many internal lights, the internal light is spaced apart from the glass of the vehicle (such as the windshield) and therefore there is an air gap between the light and the glass. This air gap can allow for the light emitted from the internal light to enter the cabin of the vehicle and impair the vision of the driver, creating flashback that can impair a driver's vision or emit light elsewhere in the vehicle (e.g., the dash) that can be distracting to the driver. Additionally, while internal lights are less visible from the exterior of the vehicle than external lights, the internal lights are often still visible.

The material choice in conventional internal lights can also adversely affect light output. For instance, each type of material may have different angles of incidence, refraction, and reflection of light. Some lighting materials may also provide optical polarization of the light module emission. For example, light emitted from a conventional interior light that is spaced apart from the glass of the vehicle has a component that reflects off the surfaces of glass rather than passing through. This reflected light from the interior most surface of the glass is more significant when the glass and interior light have an angular relationship to each other. There is a chance that this portion of light may enter the vehicle cabin and become a possible distraction to the driver. In other words, the beam of light from a conventional interior light spreads from the light source, which creates a variability of the angle of incidence of the light relative to the windshield, and which also can become a source of leakage into the vehicle cabin. Vehicle windshields can be typically constructed by laminating multiple glass elements, which creates additional surfaces of glass, beyond the inner most surface, that may influence the light beam.

SUMMARY

The present application relates to a lighting system for specialty lighting, which may be attached to a motor vehicle with a window (e.g., glass, plastic, etc.) that is light transmissive. The lighting system may include one or more light assemblies attached to the window (e.g., any glass of the vehicle including the roof) in an interior or exterior of the vehicle.

In one embodiment, a lighting system is provided for mounting a light assembly to a window of a vehicle on the interior side of the window. The lighting system may include a light attachment separable from the light assembly, where the light attachment (e.g., a button) includes an attachment surface constructed to substantially bond to the window in conjunction with an adhesive. The light attachment may be removably connected to a support which in turn may be removably connected to a light element. The light element may be connected to an optical path translator. There may also be a wire management system on the opposite side of the bracket from the light element to hold any wires from the light element. All or some of the elements described above may be surrounded by a cover which prevents light emitted from the light element from entering the cabin of the vehicle. The cover may have a bellows or flexible features near the window to ensure light system sealing. The cover may have one or more thermal relief vents to allow heat to escape the light assembly without allowing light to enter the cabin of the vehicle. The lighting system may include one or more sensors, for example to determine day/night, oncoming night time traffic headlights, traffic signaling, other vehicles equipped with signal lighting, or to assist with synchronization of signal lighting with visual light from a source external or to assist with synchronization by radio frequency signals, including satellite or terrestrial source transmit/receive antennae, to the vehicle.

In one embodiment, the optical path translator may be made of a low durometer silicone, which may provide reduced or minimal signal attenuation across the visible spectrum, UV, or IR wavelengths. The surface of the optical path translator may be patterned in a way that is functional, decorative, or informative. The optical path translator may have one or more optical apertures which align directly with the light element(s). The optical path translator may have one or more optical tubes which direct light from the light element to the window of the vehicle through the optical aperture(s). The optical path translator may also have one or more mirrors or reflectors to help direct the emitted light.

The optical path translator may have a rounded surface to direct the emitted light, and the rounded surface may be a light pipe.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 8A depicts a top view of a lighting system according to one embodiment.

FIG. 8B depicts a top view of a lighting system according to one embodiment.

DESCRIPTION

Figure 1:
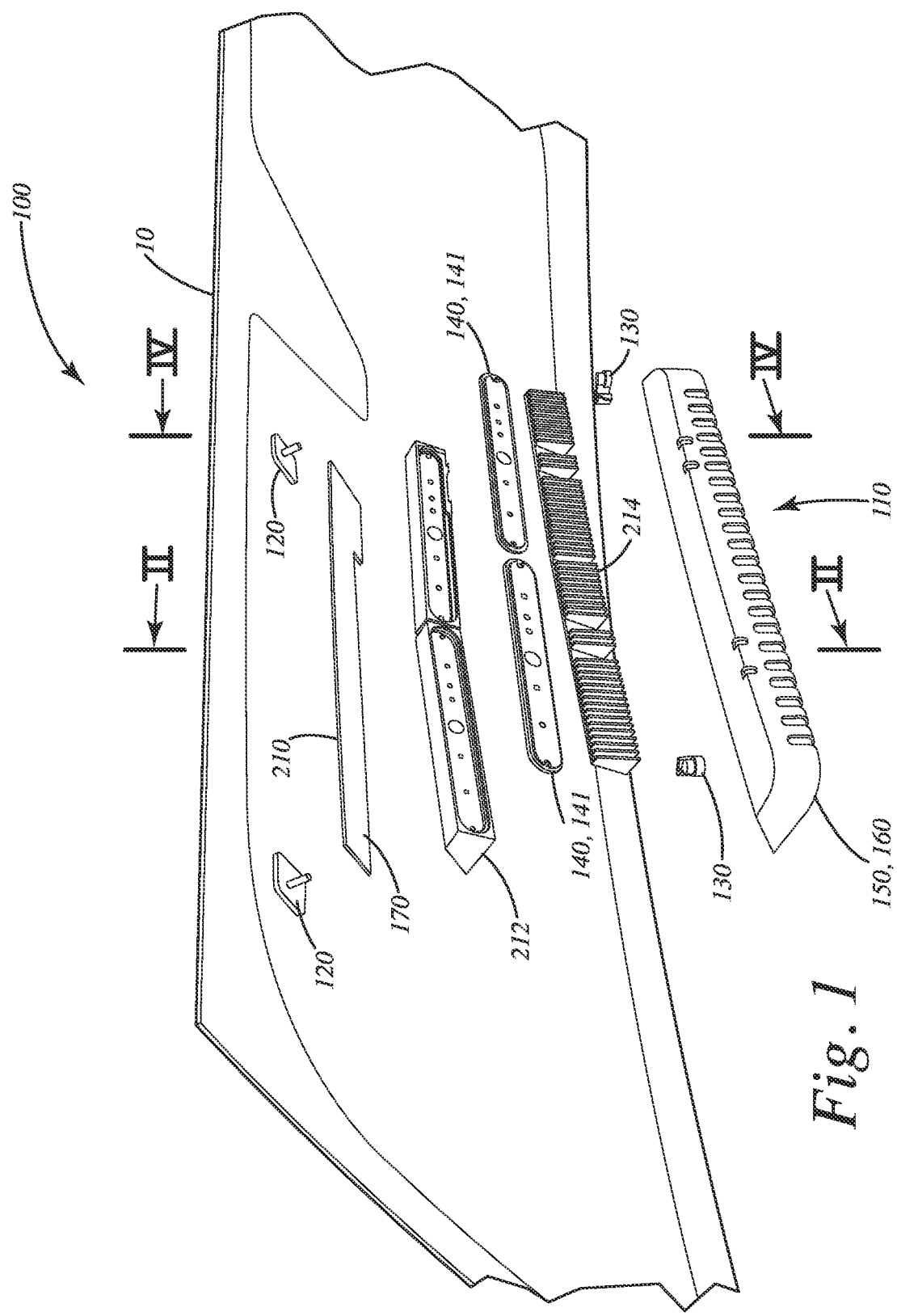
FIG. 1 shows a perspective view of a lighting system according to one embodiment.

A lighting system in accordance with one or more embodiments is described herein. The lighting system may provide specialty lighting, which may be attached to a motor vehicle with a window, such as a feature (e.g., glass, plastic, etc.) that is light transmissive (e.g., transparent or translucent, or partially non-opaque). The lighting system may be integrated with the motor vehicle according to one or more methods. In one embodiment, the lighting system may be provided with electrical and signal connectivity for a motor vehicle with potential advantages over conventional integration methods.

Specialty vehicle examples may include police vehicles, emergency responder vehicles, school buses, transit buses, fire equipment, ambulances, sanitation equipment, rail equipment, off-road vehicles, highway and transportation support equipment, and electric or hybrid-electric vehicles or other non-conventional transportation vehicles or carriers. A vehicle according one embodiment, such as an emergency vehicle, may be purposed to keep lighting equipment concealed and generally non-conspicuous. It should also be understood that the present disclosure is not limited to integrated lighting configurations for specialty vehicles, and that the constructions and methods disclosed herein may be utilized in connection with any window or partially transparent portion, or fully transparent object, of a motor vehicle or in window applications outside the field of motor vehicles.

In one embodiment, signal lighting may be integrated into a specialty vehicle, such as an emergency vehicle. The arrangement of lighting may involve connection to a regulated or unregulated supply power from the vehicle's electrical system, and to controlling signal lines for light mode control, as well as enhancing safe attachment and thermal management from the heat generated by the light itself.

The lighting system may be configured to substantially avoid safety zones like air bag deployment zones or vehicle head impact collision (HIC) zones. This may include both the location of the light and the corresponding electrical wiring location. The lighting system in one embodiment may be arranged to enhance protection of the driver from high brightness lighting, so as to avoid substantially distracting him or her by the light energy which reflects, refracts, or otherwise reenters the driver's location in the vehicle.

The lighting system in accordance with one embodiment may involve mounting of lighting, which most often includes a multitude of lighting segments, by making modification to the vehicle or window, or both, such as drilling holes for electrical wiring connections and mounting fasteners. Additionally, or alternatively, the lighting system according to one embodiment may enable avoidance of modifications utilized in conventional systems.

One or more embodiments according to the present disclosure may provide at least one of the following: mechanical attachment, removable lighting, substantial compliance with environmental operational conditions, enablement of lower or lowest profile light (potentially improving driver visibility), minimization or reduction in any headliner and vehicle structure dependency, independence from vehicle geometry, and utilization of design and fabrication technology that facilitates partnership with a lighting company, glass manufacturer, and installer.

The lighting system in one embodiment may provide lighting elements that emit light, steady on or strobing, in a specialty vehicle with minimal to no stray light return (reflection, refraction). This configuration may significantly enhance the safety of vehicle operation. To achieve reduction in stray light return, a cover may be incorporated into the lighting system that encompasses the light element (in conjunction with the window) and facilitates generation of a wedge shaped 'light funnel'. This configuration may produce a seal against the non-perpendicular vehicle window (e.g., glass), while allowing light output to direct in a controlled horizontal path, and provide non-rigid or soft touch surfaces to the vehicle occupants.

Mounting of the light assembly in one embodiment may involve one or more lighting attachments bonded to a vehicle window and configured to removably connect to the lighting assembly. In this way, use of conventional suction cups for attachment to the vehicle window may be avoided. Additionally, or alternatively, the one or more lighting attachments may avoid installation of a bracket attachment system to vehicle structure underneath the interior trim headliner.

The lighting system in one embodiment may be configured to substantially avoid interference with defined safety zones for airbags, head impacts, and so on in the event of a collision. Thus, the lighting system may provide a low profile system that enhances safety, without substantially reducing the effectiveness of the one or more lighting attachments.

The lighting system in one embodiment may be robustly mounted, sealed against the glass, and provide a low profile as described herein. The lighting system also may be removable for service or end of lease of the vehicle, leaving little to no damage to the original vehicle aesthetics. The lights and corresponding covers of the lighting system may be vehicle specific to adequately remain small in profile while sealing against different glass contours of different vehicle models. Power and signal electrical wiring may be routed to substantially avoid key safety wiring, such as air bag activations. Power and signal electrical wiring routing options have become few with the later model vehicle incorporation of high tensile safety steel used around the door and window openings—the lighting system according to one or more embodiments herein may mitigate against these fewer options by providing alternative wire routing options other than placing a hole in tensile safety steel.

One embodiment of the present disclosure may provide an integrated, finished look so that added lighting and signaling in the lighting system looks as if it were built in at the vehicle factory. This configuration may enhance the appeal for many customers of emergency vehicles (fleet owners and specifiers, municipal departments and corresponding fleets, etc.). In many instances, the major vehicle manufacturers may adopt lighting design according to one embodiment that looks more of a styled and integrated appearance over the historical "bolt on" or appearance of non-factory looking screws, bolts, and fasteners attaching auxiliary equipment. Additionally, or alternatively, the vehicle manufacturer may adopt a lighting design that includes various colors, materials, or textures, or any combination thereof.

Overall safety of both driver and other vehicles around the driver may be enhanced according to one or more embodiments of the present disclosure. For instance, the lighting system may incorporate a light element disposed within the vehicle cabin at a zone other than a significant impact zone. Additionally, or alternatively, the lighting system may incorporate a cover that substantially directs light away from the vehicle cabin to avoid distracting an operator of the vehicle.

The window may be any type of window, including an articulated or non-articulated window. It should be understood that examples shown for a stationary (non-articulated) window can be adapted for movable (articulated) window applications.

Although described primarily in connection with coupling to a window, the lighting system in one embodiment may additionally or alternatively attach to one or more other components of a vehicle, including metal components of the vehicles, such as fenders, bumpers, headlamps, roof, hoods, interior trim panels, and each with many custom brackets (e.g., metal or non-metal). In one embodiment, the custom brackets are made of metal, but the custom brackets may alternatively be made of any suitable material. In another embodiment, the lighting assembly and optical coupler may be integrated behind a headlight cover or other non-opaque vehicle feature.

A specialty purpose vehicle in one embodiment may be ordered from a vehicle manufacturer, and then taken to an upfitter company that disassembles and/or retrofits a portion of the vehicle to add lighting, sirens, and other equipment in accordance with one embodiment. While modifications are accepted for many specialty vehicles, one embodiment according to the present disclosure includes a more cost effective and/or efficient approach that provides more fully integrated and incorporated options directly from the vehicle manufacturer. The end customer may utilize one stop shopping (not coordinating with a separate upfit), one common warranty, support and service, etc. It should be understood that the present disclosure is not limited to configurations that cut out the upfitter. Other special purpose vehicle options may still involve separate upfit, and many applications of intentional vehicle conspicuity may benefit from the traditional upfit look and performance. Additionally, or alternatively, installation kits may be provided, to enable simple alignment and robust attachment to a vehicle.

I. Interior Lighting Assembly

A lighting system in accordance with one embodiment is depicted in FIGS. 1, 2A, 2B, and 3, 4, 5A, and 5B and generally designated 100. The lighting system 100 is attached to a window 10 (e.g., glass), which is depicted as a windshield of a vehicle—but as discussed herein, the present disclosure is not so limited. The lighting system 100 may be implemented with any type of window (e.g., a glass window).

The lighting system 100 in the illustrated embodiment includes a light assembly 110 and at least one light attachment 120 that may be bonded to the window 10 in conjunction with an adhesive. A variety of adhesives may be utilized, including for example acrylic acid and methacrylate found in Permatex® rearview mirror adhesive. This configuration is considered more robust than a suction device or suction cup that can be removably coupled to the window via establishment of a vacuum between the suction cup and the window. The adhesive or bonding agent may be configured to provide an attachment to the window 10 that can endure in accordance with environmental exposure specifications, such as ISO-16750-4. A material that is attractive from the exterior may be provided for the light attachment 120 and bond between the light attachment 120 and the window 10. In one embodiment, the light attachment 120 is made from stainless steel with an e-coating. The material that the light attachment 120 and bond are made from may also avoid reflective light issues for matters of concealment, in one instance being dark or black.

Coupling between the light attachment 120 and the light assembly 110 may vary from application to application. In one embodiment, the light attachment 120 may be configured to provide a snap, thread, or quarter turn connection in conjunction with an attachment interface 130 of the light assembly 110.

Additional examples of lighting attachments suitable for use in embodiments of the current disclosure are described in U.S. Pat. No. 10,227,034 entitled INTEGRATED LIGHTING, filed on Sep. 15, 2017, to Litke et al., which is hereby incorporated by reference in its entirety.

The light attachment 120 may be configured to removably connect to the light assembly 110. This way, the light assembly 110 may be removably attached to the window 10.

In the illustrated embodiment, the light assembly 110 is removably attached to two lighting attachments 120 that are bonded to the window 10. The light assembly 110 in the illustrated embodiment is shown disposed in proximity to the driver-side headliner of a vehicle—but it should be understood that the light assembly 110 may form a light bar disposed across both the driver side and passenger side of the vehicle or the light assembly 110 may be disposed in proximity to the passenger-side headliner of a vehicle. Alternatively, the lighting system 100 may be implemented internally or in the vehicle cabin in conjunction with a side window of a vehicle, which can be tinted.

The at least one light attachment 120 may form a mountable mechanical feature on the window 10, to which the light assembly 110 may attach. This type of attachment in one embodiment may form the sole structural attachment between the light assembly 110 and the vehicle. In this way, no drilling of bracketry or fasteners for mounting to structural support elements of the vehicle (e.g., the roof or A pillar or B pillar) may be involved in one version of this embodiment—although such elements may be utilized for support in alternative versions.

The lighting system 100 in the illustrated embodiment may include a light element 140, a support 150 (e.g., a bracket), a cover 160, and an optical translator 170 (e.g., an optical path translator). An attachment interface 130 of the light assembly 110 may attach or couple the light assembly 110 to the light attachment 120. In the illustrated embodiment, the light attachment 120 is shaped as a first cylinder of a larger diameter with a second cylinder of a smaller diameter and larger height extending from a flat surface of the first cylinder. The second cylinder of light attachment 120 is sized to fit through or couple to the attachment interface 130. Other shapes and configurations of the light attachment 120 may be implemented in alternative embodiments. In the illustrated embodiment, the attachment interface 130 includes a retaining element (e.g., a nut) and a cylindrical opening through the support 150 and the cover 160. The attachment interface 130 may be configured in any way to allow accommodation of and coupling with the light attachment 120. In an alternative embodiment, the attachment interface 130 may define an opening through the support 150 that facilitates engagement with the support 150 to support the light assembly 110 on the window 10. The cover 160 may not include the attachment interface 130, such that the cover 160 may not be directly coupled to the light attachment 120. For instance, the cover 160 may be attached to the support 150 separate from the attachment interface 130 such that the cover 160 is indirectly coupled to the attachment interface 130.

The support 150 in one embodiment may be configured to enable adjustment in an angle of the lighting system 100 relative to the rake angle of the window 10. For instance, the support 150 may be operable to pivot such that attachment to the light attachment 120 is substantially normal to the surface of the window 10, whereas the angle of the light element 140 can be provided substantially parallel to the ground plane of the vehicle. Additionally, or alternatively, the support 150 may be integral to another component of the lighting system 100, for example as part of a heat sink on the light element 140 or as part of the cover 160, rather than a separately detachable component as depicted in FIG. 1.

The cover 160 in one embodiment may be formed of silicone or a low durometer flexible material such as a Thermoplastic Elastomer (TPE), Thermoplastic Polyurethane (TPU), or Thermoplastic Rubber (TPR), and the cover 160 may be compatible to provide an overall soft surface and/or soft structure. The cover 160 may be substantially opaque to prevent light transmittance. The cover 160 as described herein may include one or more window interfaces, such first and second window interfaces 216, 218, operable to form a seal with the window 10, which can be achieved via 2-shot molding or similar process. In one embodiment, the first and second window interfaces 216, 218 correspond to a bellows detail that seals with the window 10. The first window interface 216 or the second window interface 218 may be flexible to enable formation of a seal against the window 10 despite changes in the angle of the light assembly 110 relative to the window 10 between applications or despite variances in the curvature of the window 10 from one vehicle type to another, or any other type of variation between the light assembly 110 and the window 10, or any combination thereof.

The cover 160 may also include symmetrical or asymmetrical cosmetic elements.

In one embodiment, the cover 160 may include a wire exit (potentially a strain relief) at one or both ends of the lighting system 100. For instance, the cover 160 may include a molded-in wire guide 561A-B in the illustrated embodiment of FIG. 5B.

With reference to FIG. 1, the light element 140 is removably attached to the support 150. The light element 140 may interface with a heat sink 214 that facilitates conduction of heat generated by the light element 140 into the surrounding environment. The heat sink 214, in one embodiment, may provide a reference vertical surface for mounting and aiming the light element 140 relative to the light assembly 110. The light element 140 and heatsink 214 may also be in thermal communication with the support bracket 150 to provide further thermal management where support bracket 150 material at least includes partial thermal conductivity properties.

In one embodiment, the support 150 preloads the light assembly 110 to the window 10 to meet the curvature of the window 10, in conjunction with the first and second window interfaces 216, 216. For example, the light assembly 110 may be preloaded to the window 10 by a retainer clip or a threaded nut, thereby capturing the support 150 via the attachment interface 130 opening with the preload of a retainer (e.g., a nut) onto the light attachment 120. The support 150 is optionally surrounded by the cover 160 such that the cover 160 conceals the support 150 and the light element 140 and substantially prevents light emitted from the light element 140 from leaking into or entering the cabin of the vehicle.

The optical translator 170, in the illustrated embodiment, is disposed between a lens 212 and the window 10, and may be optically coupled to the window 10 via a window interface 210 of the optical translator 170 (e.g., a wetted interface). The lens 212 may be configured to provide a lens prescription for a plurality of light sources of the light element 140. In other words, the lens 212 may provide converging or diverging configurations (e.g., convex or concave) for the light sources of the light element 140. The lens 212 may be configured to provide different types of configurations for two or more light sources of the light element 140, such as the configuration shown in FIG. 8A with different lens configurations for two or more light sources of the light element 140.

The lens 212 in the illustrated embodiment is constructed of a silicone material, which may be similar to or different in several ways to the silicone construction of the optical translator 170. For instance, the lens 212 may be formed of a silicone material having a greater hardness than the silicone material that forms the optical translator 170.

Figure 2A:
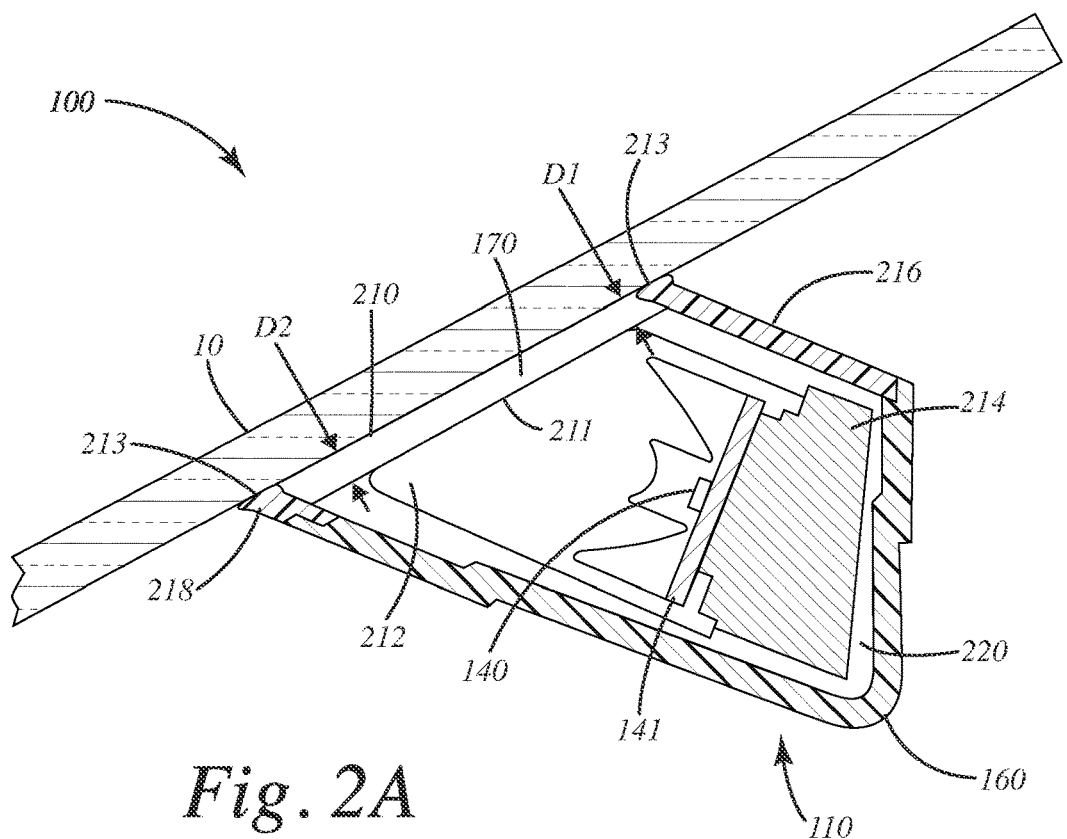
FIG. 2A shows a cross-sectional view along line II-II of the lighting system in FIG. 1.
Figure 2B:
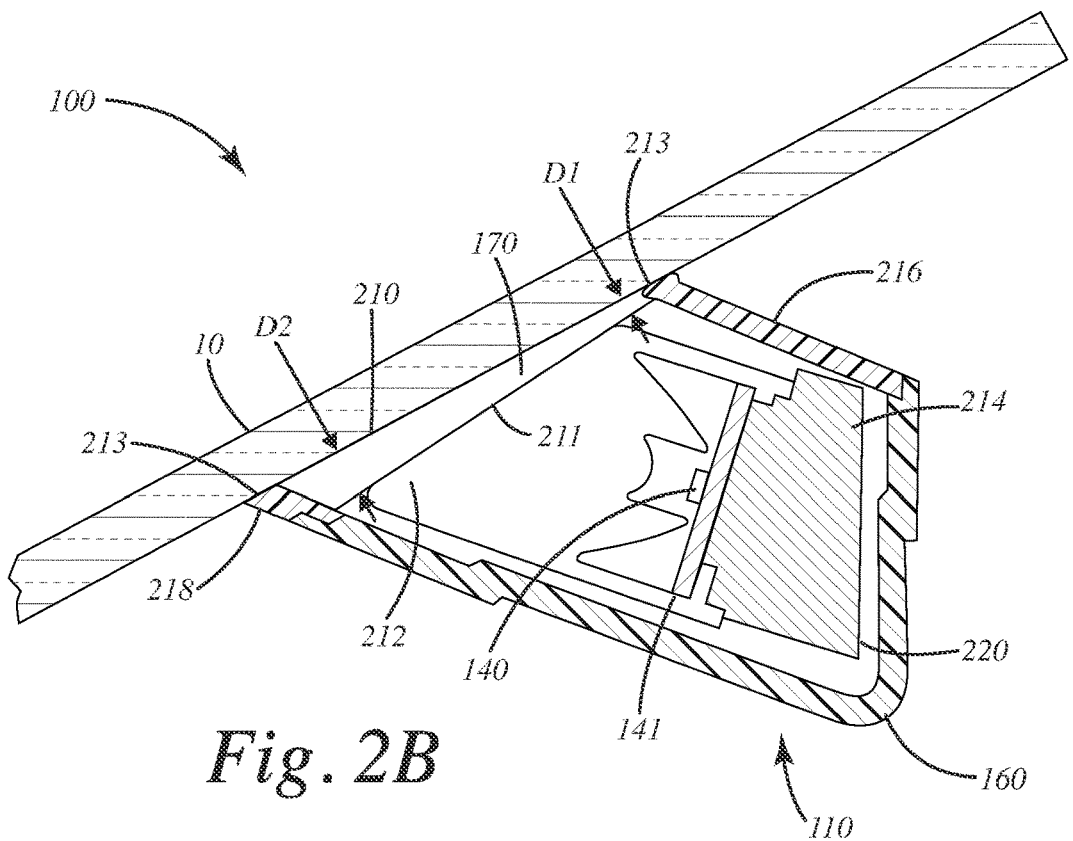
FIG. 2B shows a cross-sectional view along line II-II of the lighting system in FIG. 1.
Figure 2C:
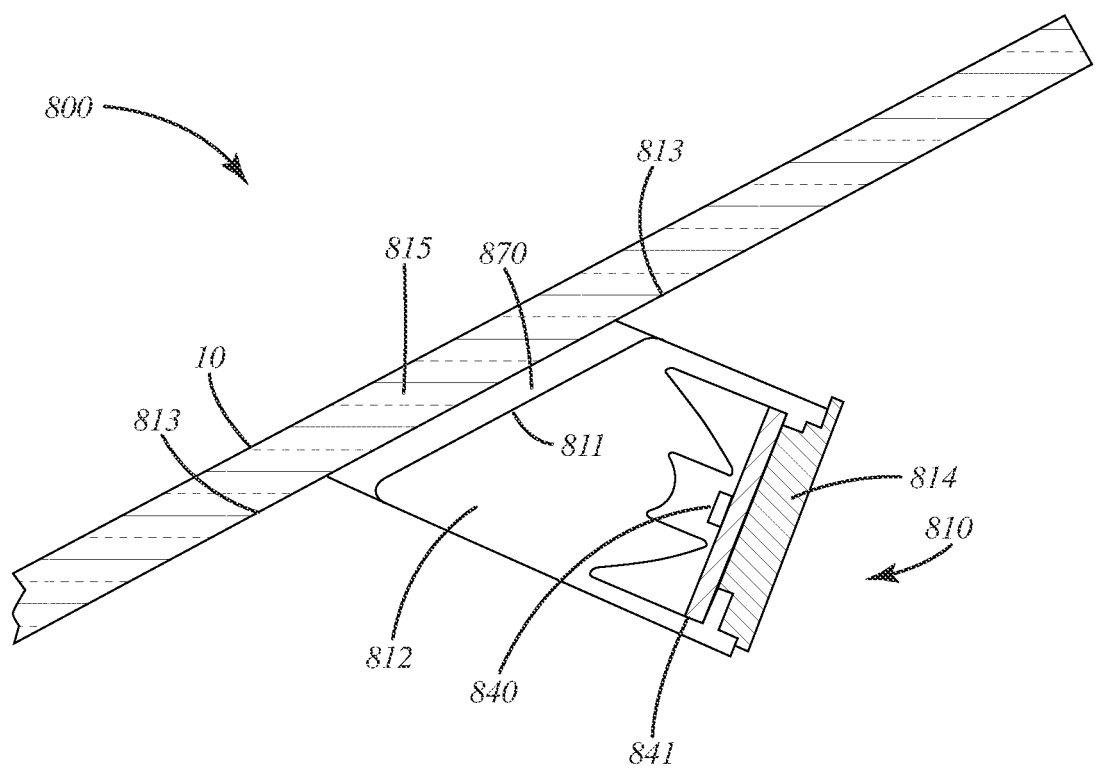
FIG. 2C shows a cross-sectional view of an alternative lighting system.
Figure 2D:
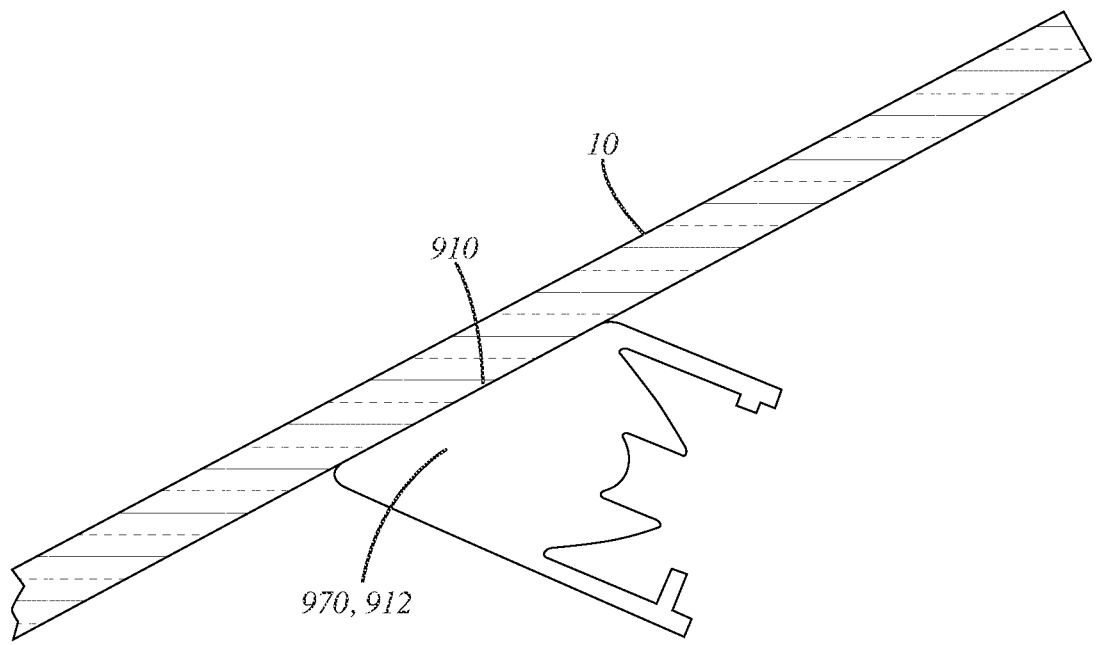
FIG. 2D shows a cross-sectional view of an alternative lighting system.

In an alternative embodiment, depicted in FIG. 2D, the optical translator 170 and the lens 212 may be integrated to form a unitary lens and optical translator 912, 970. The unitary lens and optical translator 912, 970 may provide a window interface 910, similar to the window interface 210 described herein. The unitary lens and optical translator 912, 970 may provide a unified silicone lens that includes the optical translator as well as geometry for a lens prescription or light guide. The unitary lens and optical translator 912, 970 may be incorporated with other materials mechanically or over molded to provide support to maintain geometry depending on the application.

The window interface 210 of the optical translator 170 may provide a frictional surface to assist support of a generally wedge shaped lens 212. For example, the window interface 210 may be a wetted interface such that the optical translator 170 "wets" to the window 10. This type of wetted interface may be provided because of the low durometer of the optical translator 170. The material selected may also include some tackiness for the window interface 210 (e.g., a wetted interface). For instance, if an application needs the additional frictional and wetting fitment, the selected material may include some tackiness for the window interface 210 or an index matching optical adhesive. The optical translator 170 is described in further detail herein. A light interface 211 of the optical translator 170 may be configured in a manner similar to the window interface 210, except the light interface 211 may be configured to contact the lens 212 (e.g., or, optionally, the light element 140) instead of the window 10.

The optical translator 170 may be configured to compress or distort in order to provide an optical coupling between the lens 212 and the window 10. As described herein, the general curvature of the window 10 may not exactly match the curvature of the light assembly 110, or a rake angle of the light assembly 110 may not exactly match the rake angle of the window 10 or assembly and install tolerances. In the illustrated embodiments of FIGS. 2A and 2B, the rake angles between the window 10 and the light assembly 110 are different, with the optical translator 170 maintaining contact with the window 10 via the window interface 210 and contact with the lens 212 via the light interface 211. The distance D1 and the distance D2 depicted in FIGS. 2A and 2B are different, showing the optical translator 170 being more squished (more compressed) with respect to distance D1 in FIG. 2B relative to the distance D1 in FIG. 2A. The optical translator 170 is less squished (less compressed) with respect to distance D2 in FIG. 2B relative to distance D2 in FIG. 2A. In FIG. 2B, the optical translator 170 can be seen at distance D1 to adjust to less available space by thinning relative to the same distance D1 in FIG. 2A, and the optical translator 170 can be seen at distance D2 to adjust to more available space by thickening relative to the same distance D2 in FIG. 2A. The first and second window interfaces 216, 218, provided as trim for forming a seal (e.g., a light seal) with the window 10, may also adjust for different geometry configurations between the light assembly 110 and the window 10, such as by compressing or expanding to contact the window 10. The first and second window interfaces 216, 218 may be formed of silicone or another material capable of adapting to the window 10.

Optionally, a flexible support 220 may be provided for the light element 140 and the heat sink 214 that enables further movement and/or distortion with respect to the optical translator 170 in order to provide the contact with the window 10 via the window interface 210 and the contact with the lens 212 via the light interface 211.

In one embodiment, the cover 160 may be a soft structure (e.g., a hardness of 20 to 60 Shore A). As an example, the cover 160 may be formed of black silicone. The soft structure is considered less likely to have a significant impact on the occupants of the vehicle in the event of a crash than a hard surface, and may include a non-reflective exterior surface. The cover 160 may be sized to conceal the support 150 without being so large as to obscure the vision of a driver of the vehicle. The cover 160 may be a variety of sizes depending on the desired application. The cover 160 may optionally include at least one thermal relief vent 330 as shown in one embodiment in FIG. 3.

With reference to FIG. 2A, a cross-sectional view of FIG. 1 along line II-II is shown. The light assembly 110 is shown attached to the window 10. The optical translator 170 is attached to the window 10 on one surface through the window interface 210. The optical translator 170 is attached to lens 212 on an opposite surface through a light interface 211. The light element 140 is removably attached to the support 150, and includes a printed circuit board assembly 141 that may include a plurality of light sources. The light interface 211 may be generally planar or non-planar, and in one embodiment, may be configured to allow more precise optical beam adjustability of light element 140 relative to the window 10. For instance, the rake angle θ of the light element 140, depicted in FIG. 3, relative to the window may be adjusted via light interface 211. Adjustability via the light interface 211 may be provided in a variety of ways. Example configurations are depicted in the illustrated embodiments of FIGS. 2E and 2F, which include lighting systems generally designated 1000, 2000, respectively. The lighting systems 1000, 2000 are similar to the lighting system 100 with similar features sharing the same references; however, there are several exceptions, including the configuration and construction of the optical translator 1170, 2170, the lens 1212, 2212, and the light interface 1211, 2211. For example, the light interface 1211, 2211 may include curved features, mating stepped features, beveled features, or even embedded non-contact areas for custom optical effects, or any combination thereof.

The light interface 211 may be generally planar, in which the resultant or net optical path from the light element 140 to window 10 is not angular wise modified. An alternate light interface 211 may be non-planar, such as curved or stepped. This alternate light interface 211 may result in the net optical path to be angular wise modified. A light interface 211 that has a radius form can allow highly adjustable angular wise modification, while a stepped light interface 211 can provide only indexed and predefined net optical path modifications.

Figure 2E:
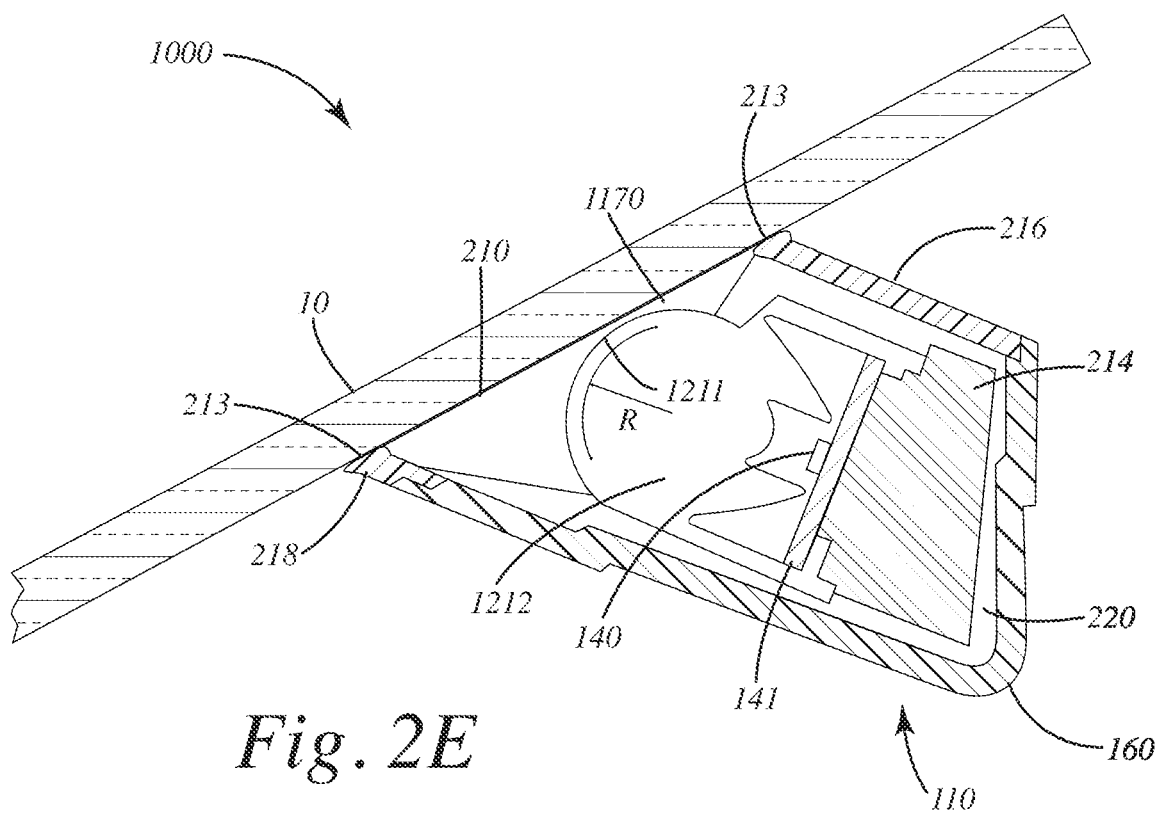
FIG. 2E shows a cross-sectional view of an alternative lighting system.

In the illustrated embodiment of FIG. 2E, the optical translator 1170 includes a light interface 1211 that is curved with a radius R that receives the lens 1212 and enables rotation of the lens 1212 within the light interface 1211 to enable adjustment of the angle of the light element 140 relative to the window 10. As described herein, the first and second interfaces 216, 218 may distort or flex to enable rotation of the lens 1212 and the light element 140, as well as any additional components fixedly connected to the light element 140. In the illustrated embodiment of FIG. 2F, the optical translator 2170 includes a light interface 2211 that includes steps B1, B2, B3 that interface with steps A1, A2, A3 of the lens 2212. Depending on the placement of the steps relative to each other, the angle of the light element 140 relative to the window 10 can be adjusted. For instance, in the illustrated embodiment step A1 and step B1 are coupled, and a displacement angle (e.g., net angle) for the light interface 2211 is 0°. If the lens 2212 is moved such that step A1 of the light interface 2211 is mated to step B2 of the lens 2212, the displacement angle may be +1°. By moving the lens 2212 linearly along the stepped surface of the optical translator 2170, a displacement angle of the light element 140 can be changed in the field. The step configuration provided in the lighting system 2000 for adjustment of the angle of the light element 140 may be incorporated into any embodiment described herein, including the curved light interface 1211 of the lighting system 1000.

Figure 3:
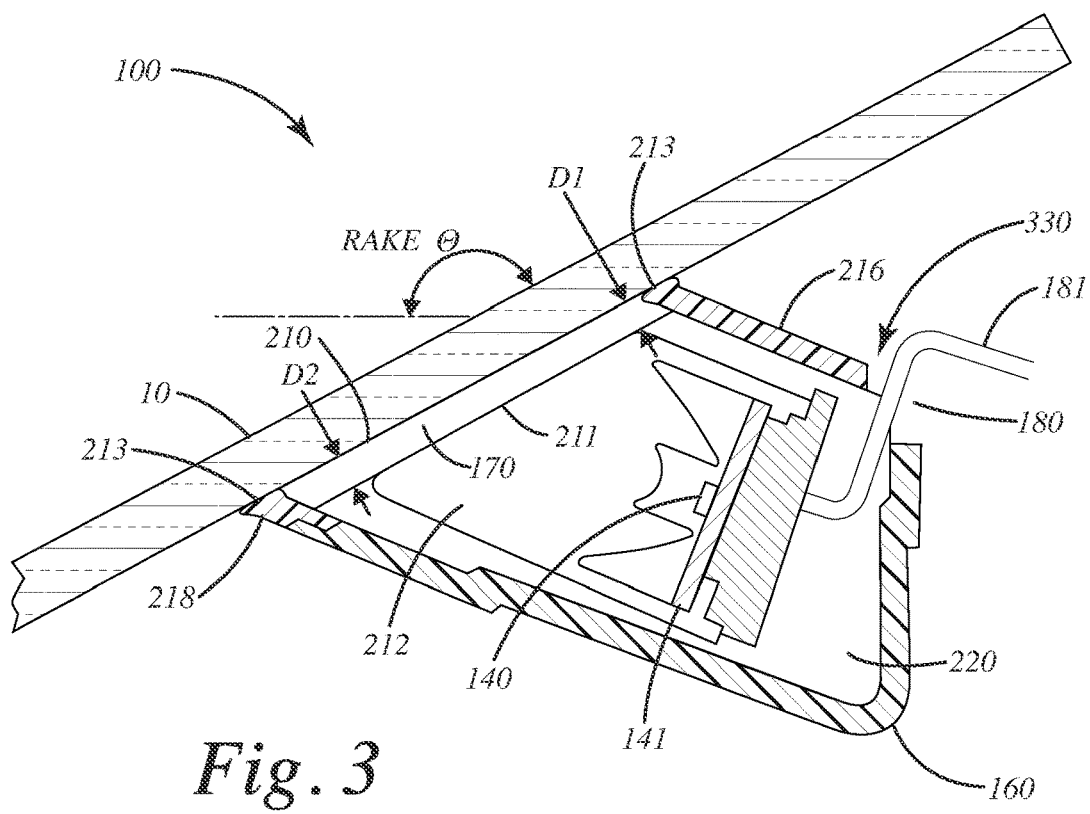
FIG. 3 shows a cross-sectional view of a lighting system according to one embodiment.

In the illustrated embodiment of FIG. 3, a cross section of the light assembly 110 is shown to depict a wire management system 180 that is optionally attached or integrated into the support 150. The wire management system 180 allows for storage of the powering, signal, sensors, and other wires of the light element 140. Alternatively, or in addition, the wire management system 180 may be a recessed surface in the cover 160 which stores the wires of the light element 140. Optionally, all of the optical translator 170, light element 140, and the wire management system 180 may be surrounded by the cover 160.

In the illustrated embodiments of FIGS. 2A and 3, the cover 160 is coupled to the window 10 via a cover interface 213, which may be formed by the first and second window interfaces 216, 218, and which may provide an adaptable light seal with the window 10 that conforms the curved surface of the window 10 and substantially prevents leakage of light (e.g., flashback leaks) into the vehicle cabin. The cover interface 213 in one embodiment may be a bellows-style interface to conform to curvature of the window 10.

Figure 4:
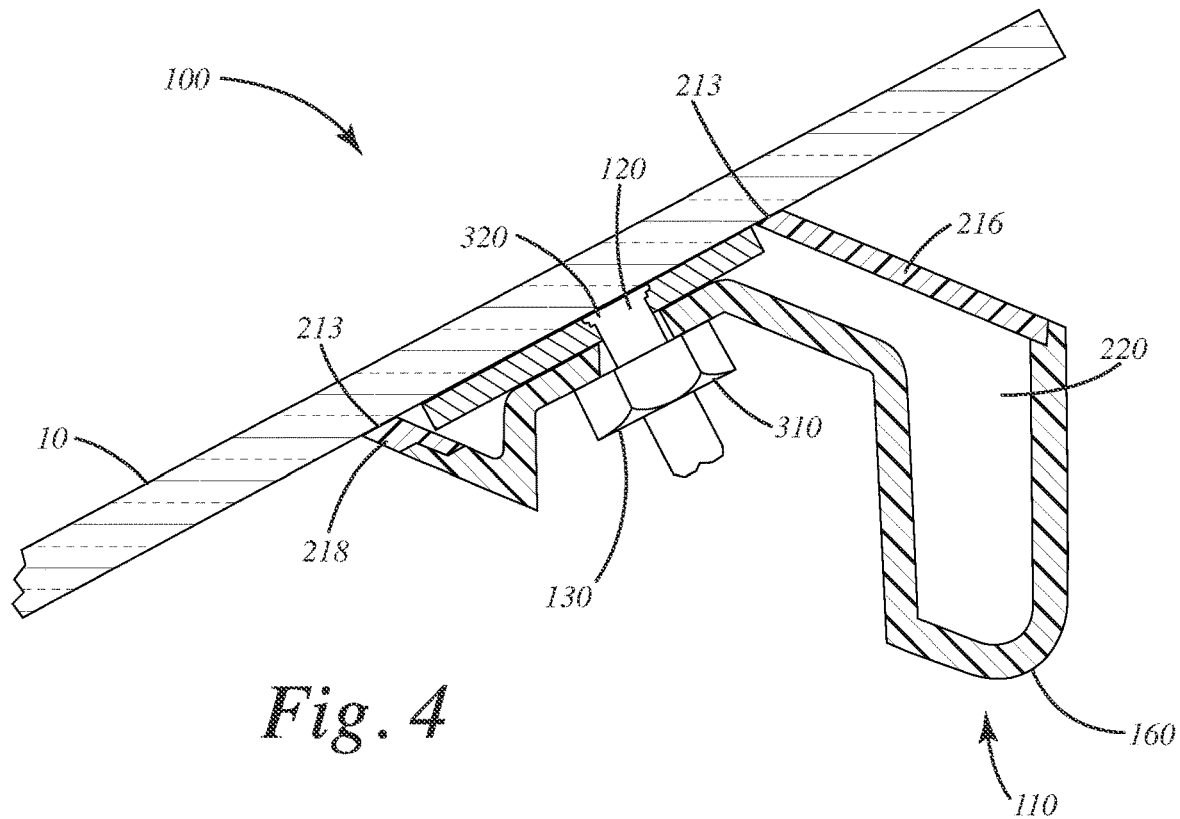
FIG. 4 shows a cross-sectional view along line IV-IV of the lighting system in FIG. 1.
Figure 5A:
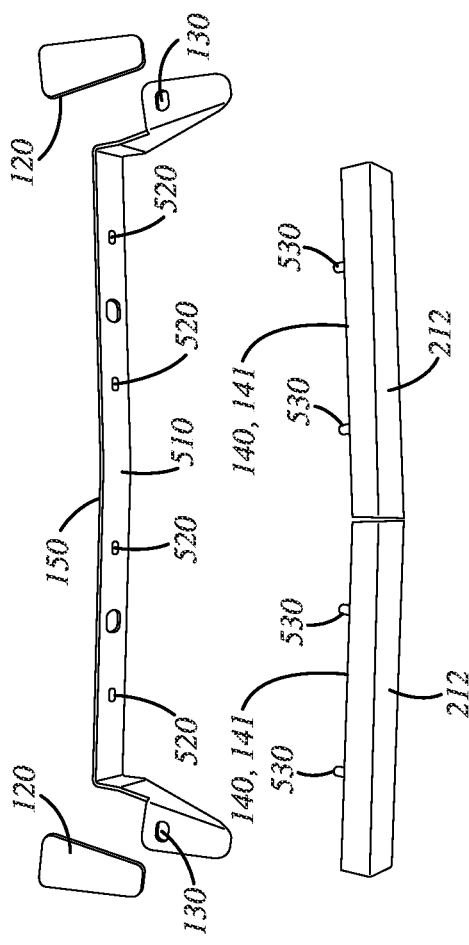
FIG. 5A depicts a perspective view of a lighting system according to one embodiment.
Figure 5A:
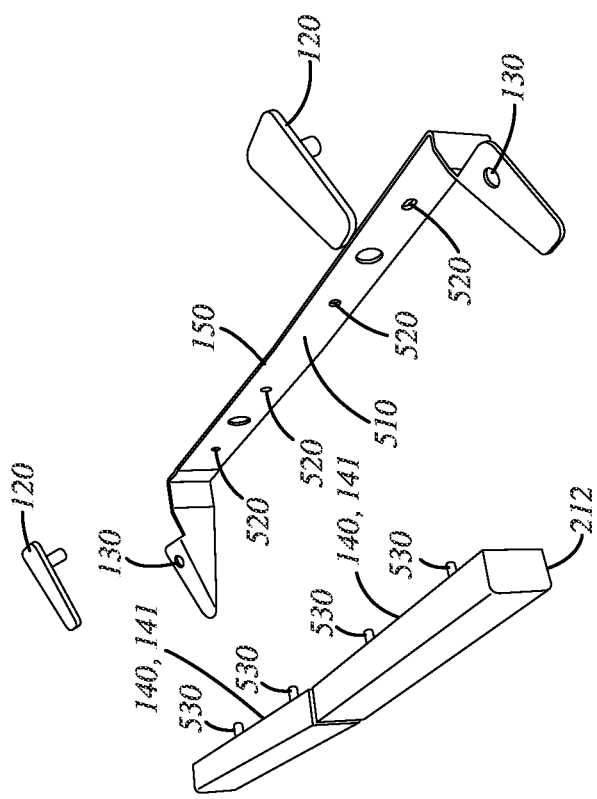
Figure 5B:
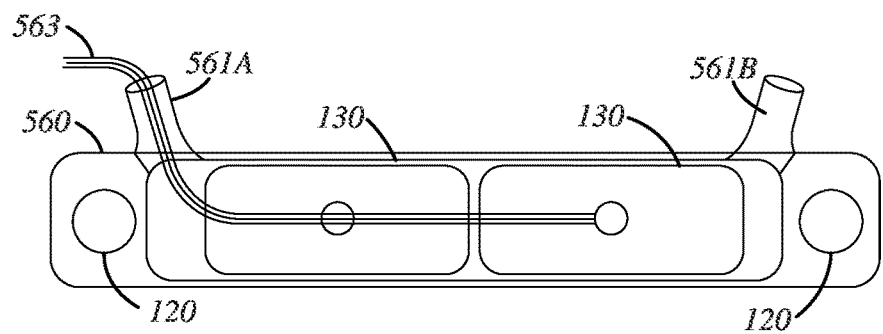
FIG. 5B depicts a rear view of a lighting system according to one embodiment.

In the illustrated embodiment of FIG. 4, a cross-sectional view of the lighting system 100 according to one embodiment is shown. FIG. 5A also shows aspects of the lighting system 100 depicted in FIG. 4. The light attachment 120 is attached to the window 10 through a bond 320. The support 150 is removably attached to the light attachment 120 via an attachment interface 130, which includes a retainer 310 (e.g., a nut or other type of attachment device). The light attachment 120 in the illustrated embodiment includes a threaded stud bonded to the window 10 via the bond 320.

The support 150 is optionally surrounded by the cover 160. The cover 160, as described herein, may include at least one thermal relief vent 330. The thermal relief vent 330 may enable heat generated by the light element 140 to escape the cover 160. The thermal relief vent 330 may be arranged to allow heat to escape without allowing a substantial amount of light emitted from the light element 140 to enter the cabin of the vehicle.

In one embodiment, the optical translator 170 may be positioned relative to the rake angle of the windshield such that an angle of 27 to 35 degrees from a ground plane, at the mounting location of the top of windshield, may allow a light element 140 to comply with specifications for lighting signal outputs provided by the Society of Automotive Engineering (SAE) and the Federal Motor Vehicle Safety Standards (FMVSS) from the National Highway Traffic Safety Administration (NHTSA). It is noted that, the range of 27 to 35 degrees corresponds to 153 to 145 degrees (180−27=153 and 180−35=145) as drawn in the illustrated embodiments with the rake angle provided on the upper side.

In the illustrated embodiment of FIG. 4, a cross-sectional view of the lighting system 100 according to one embodiment is shown. The two light attachments 120 are attached to the window 10. The support 150 is removably attached to the light attachments 120. The cover 160 surrounds the support 150 and is also removably attached to the light attachments 120. The cover 160 optionally has first and second window interfaces 216, 218 on either side of the cover near the window 10 to substantially ensure the cover 160 seals to the window 10 at or near the cover interface 213. The first and second window interfaces 216, 218, in one embodiment, may provide a bellows detail operable to seal against the window 10 at or near the cover interface 213 as depicted in the illustrated embodiment of FIG. 3.

The retainer 310 may secure the light attachments 120 to the support 150 and the cover 160. The cover 160 in one embodiment may incorporate snap-on features to engage only the support 150, and thereby cosmetically cover the retainer 310. The light element 140 may be removably attached to the support 150.

In the illustrated embodiment, the optical translator 170 may contact the lens 212 on one surface via the light interface 211 and may contact the window 10 on a surface opposite the light interface 211 via a window interface 210. In an alternative embodiment, as depicted in FIG. 2D, the optical path translator 970, 912 may contact or interface with the light element 140 on one surface via the light interface 211 and may contact the window 10 on a surface opposite the light interface 211 via a window interface 210. The optical path translator 970, 912 may incorporate aspects of the lens 212 described herein, including one or more curved surfaces operable to receive light from the respective one or more light sources of the light element 140. The one or more curved surfaces of the optical path translator 970, 912 or the lens 212 may be spaced apart from the respective one or more light sources to facilitate directing light therefrom through the window 10.

Figure 2F:
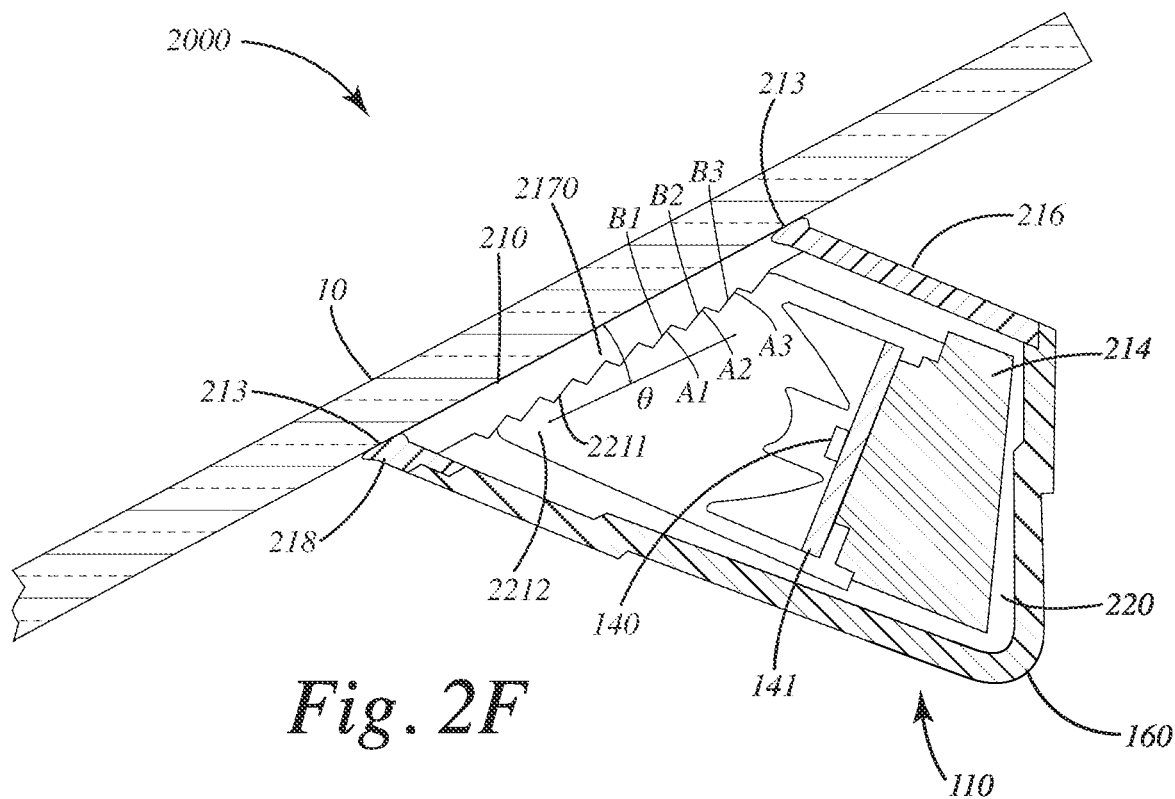
FIG. 2F shows a cross-sectional view of an alternative lighting system.

Angular adjustment of the light assembly 110 may be provided in a variety of ways, including one or more of the light interface 211 as depicted in the embodiments of FIGS. 2E, 2F, the light attachment 120, or the support 150, where the support 150 may be a custom bracket or an articulated bracket with a pivot fine adjustment mechanism for a specific glass rake angle installation in order to meet signal light operational parameters. This angular adjustment may affect the angle of the light assembly 110 relative to the rake angle of the window 10. This adjustment feature can enable a single design to adapt to a different vehicle's rake angle, enabling use of a lighting system for use with multiple types of vehicles with little or no modification to the lighting system. As a result, manufacturing and inventory costs can be reduced.

An alternative embodiment of the light system is depicted in FIG. 2C and generally designated 800. The lighting system 800 is similar in many respects to the lighting system 100, including a light assembly 810, an optical translator 870, a lens 812, a light element 840, and a heat sink 814, similar respectively to the light assembly 110, an optical translator 170, a lens 212, a light element 140, and a heat sink 214 described herein. For instance, the optical translator 870 includes a window interface 815 and a light interface 811, similar respectively to the window interface 210 and the light interface 211. The light element 840 also includes a printed circuit board assembly 841 similar to the printed circuit board assembly 141.

The lighting system 800 in the illustrated embodiment may not include a cover or a flexible support. Additionally, or alternatively, a single lighting module, multiple lighting module array, or flexible support, or a combination thereof may include additional thermal management capability, and the support may include light blocking features that surround the lighting assembly 810.

The lighting system may optionally include first and second window interfaces operable to interface with the window 10 via a cover interface. A support (not shown in the illustrated embodiment) may be provided that is similar to the support 150 described in conjunction with the lighting system 100.

In the illustrated embodiment of FIG. 5A, the light element 140 and the support 150 are shown in an exploded view relative to the light attachment 120. As discussed herein, the light attachments 120 may be sized to be inserted through the attachment interfaces 130 in the support 150. The support 150 may include a recessed surface 510 on which the light element 140 can be attached. The support 150 may include light attachment interfaces 520 that define a circular opening through the recessed surface 510. The light element 140 and heat sink 214, as depicted, may include light element projections 530 that can be received by the light attachment interfaces 520 to align the light element 140 and heat sink 214 with the recessed surface 510; however, the present disclosure is not so limited and can be constructed differently for supporting the light element 140 and the heat sink 214. The light element projection 530 in the illustrated embodiment includes an elongated projection on the rear surface of the light element 140 and heat sink 214, which is the surface that may come into contact with the recessed surface 510. The light element projection 530 is sized to fit through the light attachment interface 520. The light element projection 530 may be a clip-in style connector with barbs that prevent the light element projection 530 from sliding back out of the light attachment interface 520 after being inserted therein. The light element 140 and the heat sink 214 may also be attached to the support 150 through any suitable means. In one embodiment, the support 150 may also include features to support the optical translator 170.

In the illustrated embodiment, a cover 560 is provided with wire routing elements 561A-B that provide a wire routing option of the lighting assembly. The wire routing elements 561A-B may be integrated with the cover 560 (e.g., they may be molded as part of the cover 560). The wire routing elements 561A-B may provide access for electrical wiring 563 (e.g., power and/or control signals). One or more wire routing elements 561A-B may be present. With multiple wire routing elements 561A-B, connections among lighting assemblies may be daisy chained. The one or more wire routing elements 561A-B may provide strain relief for wiring and/or substantially prevent leakage of light from the light elements 140, and additionally may allow thermal venting. The wire routing elements 561A-B may also be capable of enabling use of a connector for a quick-disconnect configurations. The entire assembly may be removed by disconnecting connector and disengaging the attachment interface 130.

Figure 6:
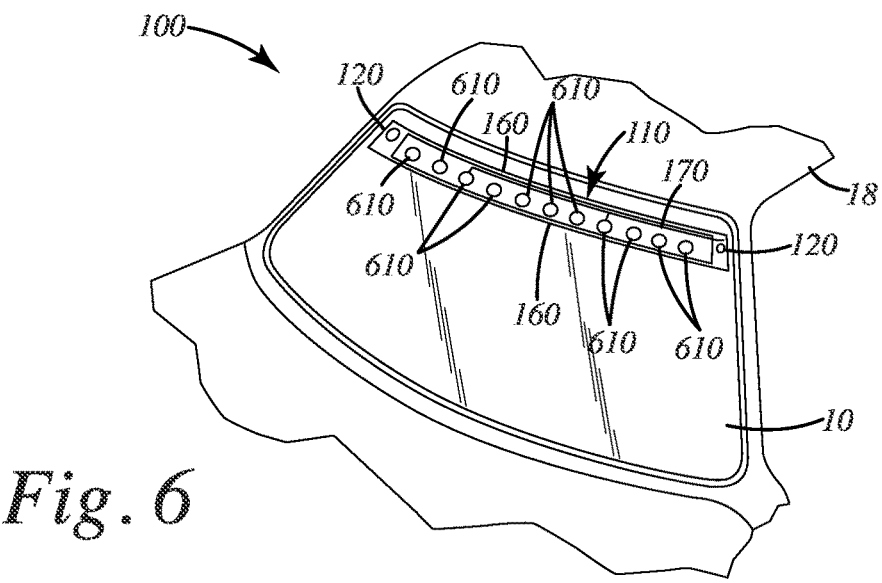
FIG. 6 depicts a front perspective view of a lighting system according to one embodiment as deployed in a vehicle.

A lighting system 100 in accordance with one embodiment is shown as installed in a vehicle in FIG. 6. The light assembly 110 is shown disposed across both the driver side and passenger side of the vehicle—but it should be understood that the light assembly 110 may be integrated solely in proximity to the driver-side headliner of a vehicle, solely in proximity to the passenger-side headliner of a vehicle, or as singular or multiple separate assemblies across the driver side and passenger side of the vehicle. The lighting system 100 may be configured to be thin and mounted high on the window 10 near the top frit edge. For example, a vehicle sun visor, when folded up against a headliner may have a set height plane. If this plane is extended forward to the interior surface of the windshield, an envelope may be described for the space bounded by this plane (approximate bottom edge of cover 160), the windshield glass, and the forwardmost edge of the headliner trim. This is the region of mounting in one embodiment. Alternatively, the lighting system 100 may be mounted low near the front dash board level, avoiding windshield defrost air vent openings. Alternatively, the lighting system 100 may be implemented internally or in the vehicle cabin in conjunction with a side window of a vehicle or a rear window of the vehicle, either of which may be tinted The light assembly 110 is shown attached to the window 10 via two light attachments 120; however, as discussed herein, more or fewer light attachments 120 may be provided. The optical translator 170 in the illustrated embodiment is coupled to the window 10 via the window interface 210. The coupling may be provided via wetting of the window interface 210 to the window 10. The optical translator 170 may include a plurality of optical apertures 610, which direct the light emitted from the light element 140 toward the exterior of the vehicle. The optical translator 170 and the light attachments 120 in the illustrated embodiment are surrounded by the cover 160.

Figure 13:
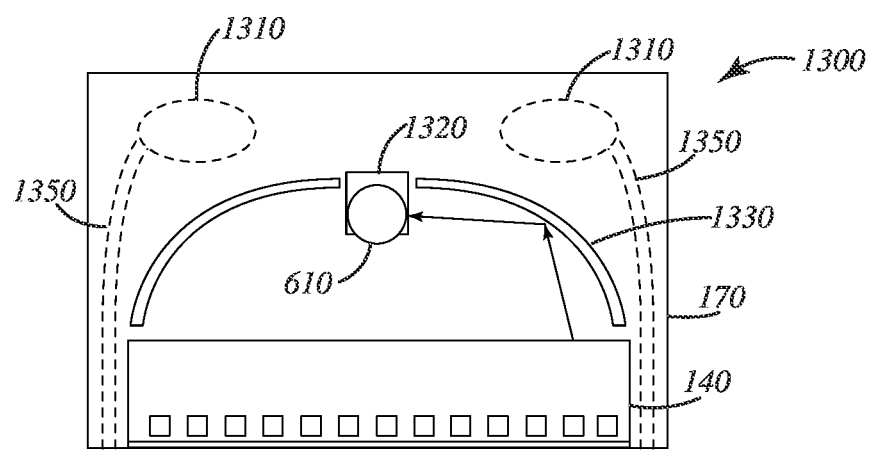
FIG. 13 depicts a partial front sectional view of a lighting system according to one embodiment.

A lighting system in accordance with one embodiment is shown in FIG. 13 and generally designated 1300. The lighting system 1300 may provide a single port (potentially round or elongated) light output. This configuration may be considered to provide a "hot eye" construction, which can also be described as the combined output of a light assembly optically coupled and consolidated to a single port. This configuration may enable a thin, low profile window attached assembly, by folding the optical output path by approximately 90 degrees. This approach can be adapted to a variety of applications, including side windows, such as small triangular areas or curved corner areas of a side exposed window. Because of the adaptability of using custom space, and potentially not encumbering the movable window, system in one embodiment may include sensors, such as those described herein. When this low profile, folded optical path option is used, custom lighting effect patterns may be obtained when provided in conjunction with the LED illumination combinations shown in FIG. 11.

The light element 140 in the illustrated embodiment is disposed at least partially within the optical translator 170. The light emitted from the light element 140 may be directed to a curved light channel 1330. In one embodiment, the curved light channel 1330 is a light pipe. In another embodiment, the curved light channel 1330 is an optical prescription reflective surface for the focus of multiple LEDs upon a location such as a mirror 1420, and for a second optical path change to exit out of one or more optical apertures 610. Additionally, or alternatively, after the light from the light element 140 is channeled to a common location, a final 90-degree optical path fold may be provided by the mirror 1420. The light may then be reflected from the mirror 1320 toward the window 10 through an optical aperture 610. The optical aperture 610 may be round, oval, rectangular, or any other suitable shape.

In the illustrated embodiment of FIG. 13, the lighting system 1300 includes one or more sensors 1310. For example, the sensors 1310 may be any one or more of day/light sensors, a camera, and a LIDAR sensor. Additional sensor examples include oncoming night time traffic headlights, traffic signaling, other vehicles equipped with signal lighting, or to assist with synchronization of signal lighting with visual light from a source external to the vehicle or from any type of on-vehicle signal source, such as an RF source (e.g., WiFi, or Bluetooth), an infrared source, or a visual source provided by the vehicle, or any combination thereof. The sensors 1310 may be connected by sensor wire paths 1340. For example, the sensor wire paths 1340 may be molded into the optical translator 170. The configuration of the optical translator 170 in one embodiment may be formatted to be substantially perpendicular to the window 10, and the optical translator 170 may be comprised of low durometer silicone that wets against the glass. If the optical translator 170 is produced in a dark color, the lighting system 1300 is less conspicuous when viewed from outside the vehicle, providing a concealed installation.

Figure 14A:
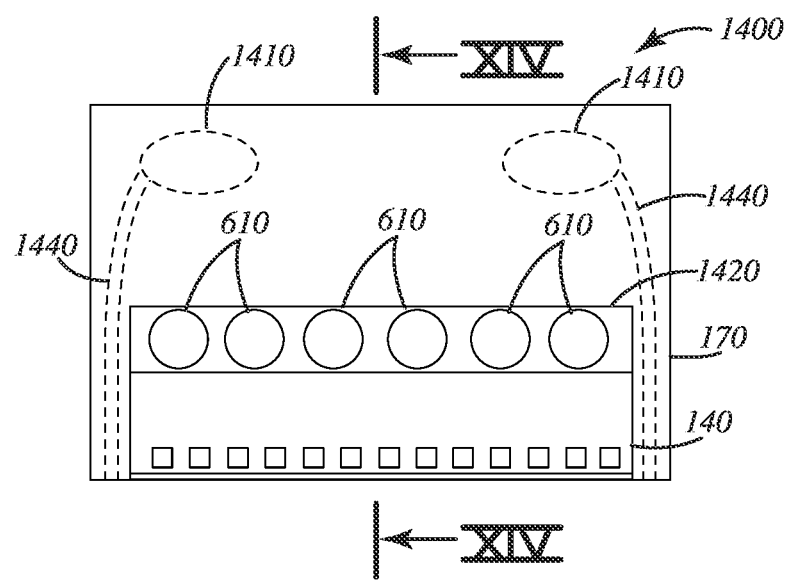
FIG. 14A depicts a partial front sectional view of a lighting system according to one embodiment.

In the illustrated embodiment of FIG. 14A, a front view of a lighting system 1400 according to one embodiment is shown. The lighting system 1400 may be similar to the lighting system 1300 in some respects, including a light element 140, one or more sensors 1410, and sensor wire paths 1450, similar respectively to the light element 140, the one or more sensors 1310, and the sensor wire paths 1340. The lighting system 1400 may be operable to provide a multi-port light output, potentially with multiple round or elongated ports. In this embodiment, rather than having the focus of all LEDs to a common optical aperture 610, each LED may have an individual optical aperture 610 as shown in the illustrated embodiment of FIG. 14A. In this example, a common single mirror 1420 can function for one or more individual LEDs that exit at multiple optical apertures 610. The mirror 1420 may be flat (planar) or non-planar with optical focusing ability.

The light element 140 is at least partially disposed within the optical translator 170. Light emitted from the light element 140 is directed upwards until it interfaces a mirror 1420. The emitted light may then be reflected off the mirror 1420 toward the window 10 through the optical apertures 610. The optical apertures 610 may be round, oval, rectangular, or any other suitable shape.

The optical translator 170 in the lighting system 1400 may be configured as part of an adapter for changing the direction of the light output from the light element 140. For instance, in the illustrated embodiment, the optical translator 170 may provide, in conjunction with the arrangement of components of the lighting system 1400, a 90° adapter for changing the direction by 90°.

Figure 14B:
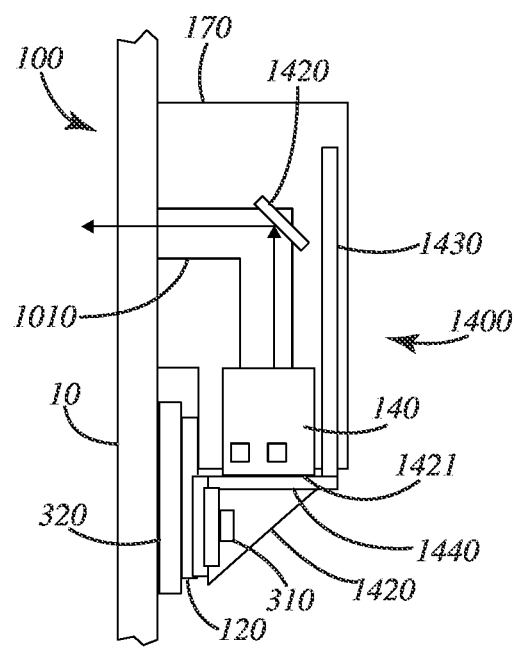
FIG. 14B depicts a cross-sectional view along line XIV-XIV of the lighting system in FIG. 14A.

In the illustrated embodiment of FIG. 14B, a cross-sectional view of the lighting system 1400 in FIG. 14B along line XIV-XIV is shown. In the illustrated embodiment, the light attachment 120 is attached to the window 10 through the bond 320, and the support 1440 is removably attached to the light attachment 120. The light element 140 is removably attached to a surface 1421 of the support 1440. A slide over rigid support 1430 is attached perpendicular to the support 1440 and behind a surface of the light element 140 that is opposite the window 10. In one embodiment, the support 1440 and the rigid support 1430 form one integral support member. At least one mirror 1420 is positioned above the light element 140 such that light emitted from the light element 140 reflects off the mirror 1420 and is directed towards the window 10. An optical translator 170 at least partially surrounds the light element 140, the mirror 1420, and the rigid support 1430. The support 1440 and the rigid support 1430 in conjunction with the light attachment 120 and the retainer 310 may hold the optical path translator in place against the window 10. In one embodiment, the optical translator 170 slides over the rigid support 1430. An optical path 1010 (e.g., an optical tube) is provided within the optical translator 170 and configured to a) direct light emitted from light element 140 toward the mirror 1420 and b) direct light reflected from the mirror 1420 toward the window 10.

Figures 15A, 15B:
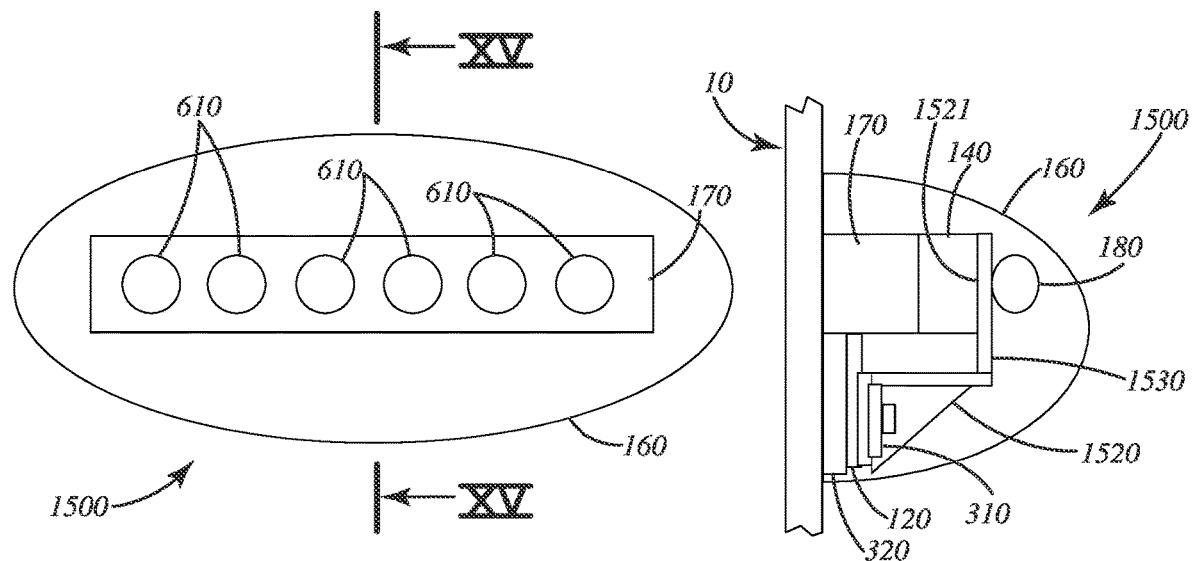
FIG. 15A depicts a partial front sectional view of a lighting system according to one embodiment.
FIG. 15B depicts a cross-sectional view along line XV-XV of the lighting system in FIG. 15B.

Turning to FIGS. 15A-B, a lighting system in accordance with one embodiment is shown and generally designated 1500. FIG. 15A depicts a front view of the lighting system 1500 as it would appear from the exterior of a vehicle, and FIG. 15B depicts a cross-sectional view of the lighting system 1500 along line XV-XV. In one embodiment, the lighting system 1500 does not have a 90-degree optical path bend, and as a result, may provide a lower profile in the top to bottom dimension than the lighting system depicted in the illustrated embodiment of FIGS. 14A-14B. The lighting system 1500 in FIGS. 15A and 15B may stick out or protrude further from the window 10 than the embodiments shown in FIGS. 13, 14A, and 14B.

In the illustrated embodiment, the optical translator 170 has a plurality of optical apertures 610 aligned with one or more light elements 140 that direct emitted light to the window 10. The optical translator 170 is at least partially surrounded by the cover 160, and optionally enclosed within an internal space defined by the cover 160 and the window 10.

The light attachment 120 in the illustrated embodiment is attached to the window 10 via the bond 320. A support 1520 is removably attached to the light attachment 120. The light element 140 is removably attached to a surface 1521 of the support 1520. A slide over rigid support 1530 may be attached perpendicular to the support 1520. In the illustrated embodiment, the light element 140 may be removably attached to the rigid support 1530 but is not in contact with the support 1520 (e.g., a bracket). In an alternative embodiment, the light element 140 may be attached to both the support 1520 and the rigid support 1430. The light element 140 may be at least partially surrounded by the optical translator 170. Light emitted from the light element 140 may be directed through the optical translator 170 into the optical apertures 610 and out the window 10. A wire management system 180 may be provided behind the rigid support 1530 on a surface opposite the light element 140. The wire management system 180 may allow for storage of the powering, signal, and other wires of the light element 140. Alternatively, the wire management system 180 may define a recessed surface in the cover 160 to store the wires of the light element 140. All or a subset of elements described above in this paragraph are optionally surrounded by the cover 160.

Figure 16:
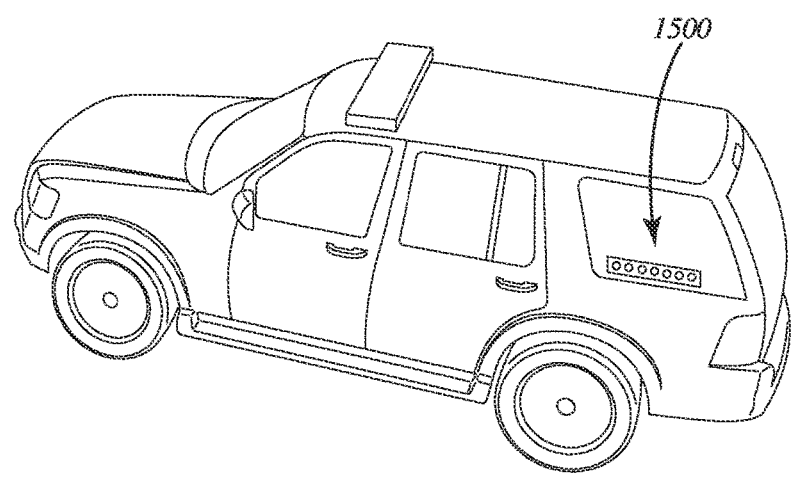
FIG. 16 depicts a front view of a lighting system according to one embodiment as deployed in a vehicle.

FIG. 16 depicts one embodiment of the lighting system 1500 as integrated into the back (or rear) or side window of a vehicle.

Figure 17:
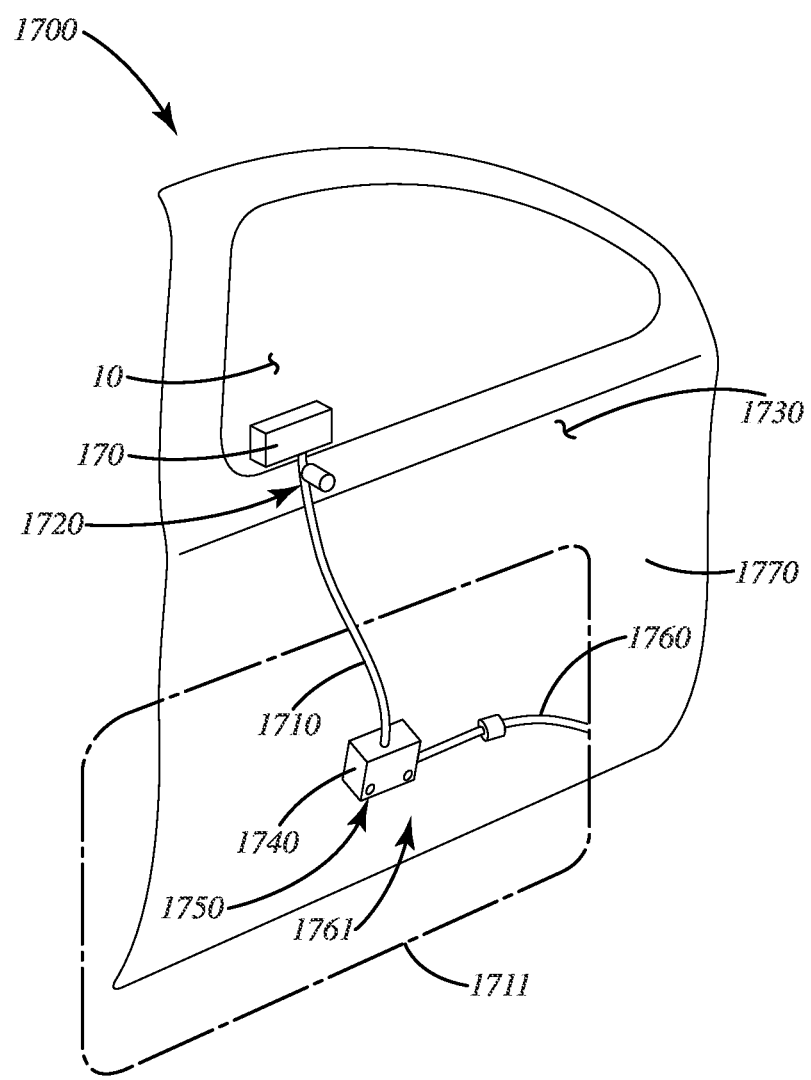
FIG. 17 depicts a perspective view of a lighting system according to one embodiment.

Turning to the illustrated embodiment of FIG. 17, a lighting system 1700 is shown where the light element 140 is separated from the optical translator 170, which is mounted to the window 10. The light element 140 may be included in a remote light system 1711 separate from the optical translator 170. This configuration may allow for design opportunities for enhancing or optimizing the format of the profile of the optical translator 170. For example, the optical translator 170 can be either low profile in terms of distance from the general plane of the window 10, or low profile in terms of the surrounding vehicle trim features.

An optical extension component 1710 may be used to extend and couple the light energy from the light element 140 to the optical translator 170. The optical extension component 1710 may include electrical signaling and power for one or more sensors that may be incorporated in the optical translator 170. In one embodiment, the optical extension component 1710 is a light pipe or a fiber optic bundle. The optical extension component 1710 may either be rigid or flexible in nature. The optical extension component 1710 may connect the optical translator 170 and the light element 140 by passing through an opening/hole 1720 in a vehicle trim component 1730.

The light element 140, in one embodiment, may be encased in an illumination module 1740. The illumination module 1740 may include a power regulation, a control signal interface, and an optical collector for transitioning the illumination source to the optical extension component interface. The illumination module 1740 may also include a thermal monitoring safety system to prevent overheating of a module located beneath the vehicle trim. In one embodiment, the optical collector may be a curved light channel 1330. If the extension option is called for in a vehicle installation, an optical collector, such as the curved light channel 1330, may be provided at the interface with the light element 140 to guide all or at least a portion of available light into the extension light pipe. The illumination module 1740 may be mounted in conjunction with at least one fastener 1750. The mounting of the illumination module 1740 may include a thermal interface with the fasteners 1750 to facilitate heat transfer to the structure of the vehicle, providing a substantially out of sight configuration for thermal dissipation. The vehicle may include a metal structure capable of being in thermal communication (e.g., thermal contact) with the illumination module 1740 for dissipation of heat therefrom. An electrical and signal connection system 1761, including connectors, may include a power and signal interface 1760 to connect to the illumination module 1740.

In one embodiment, the illumination module 1740 is disposed in a cavity or internal space of a vehicle door 1770. Additionally, or alternatively, the illumination module 1740 can be manufactured to be separate from the vehicle door 1770, with the optical extension component 1710 extending from external to the vehicle door 1770, through the internal space of the vehicle door 1770, to the optical translator 170. The illumination module 1740 can be mounted to or manufactured separate from or integral to any suitable portion of the vehicle, where the optical extension component 1710 may be either rigid or flexible to allow light transmitted from the illumination module 1740 to reach the optical translator 170.

As described herein, in one embodiment, the optical interface of the optical translator 170 to the window 10 may be configured for high rake angle windshields. The optical translator 170, in one embodiment, may be configured for interfacing with a window 10 having a more perpendicular orientation.

In the illustrated embodiment of FIG. 17, the lighting system 1700 includes a light element 140 remotely mounted relative to the optical translator 170. This configuration may aid in reducing the visible physical profile of the lighting system 1700, including the optical translator 170. For instance, in the illustrated embodiment of FIG. 14B, the light element 140 is integrated together with the optical translator 170. The optical path, in the illustrated embodiment, extends between the reference mirror 1420 from the light element 140 via an optical path 1010. The optical path 1010 may include optical fiber or light pipe technology, providing an optical extension configuration. This configuration, in one embodiment, is highly efficient in transporting illumination flux with minimal or low losses, due to the principle of Total Internal Reflection (TIR) of the optical path 1010.

It is to be understood that the remote mounted configuration, based at least in part on the optical extension component 1710, may be incorporated into any embodiment described herein. It is also to be understood that any one or more aspect of one or more embodiments described herein may be incorporated into another embodiment; and it is to be understood that any one or more aspect of the one or more embodiments described herein may be absent from such one or more embodiments.

One or more interface components may be provided to form an optical coupling between the optical translator 170 and the optical extension component 1710, or the optical extension component 1710 and the illumination module 1740, or both. The one or more interface components may include at least one optical filter component at either or both interface connections that provide optical coupling. The at least one optical filter component may include spectral filter shaping, polarizing, optical coupling improvement, diffusing, or beam shaping/tuning, or a combination thereof.

II. Vehicle Head Lamp

Figure 19:
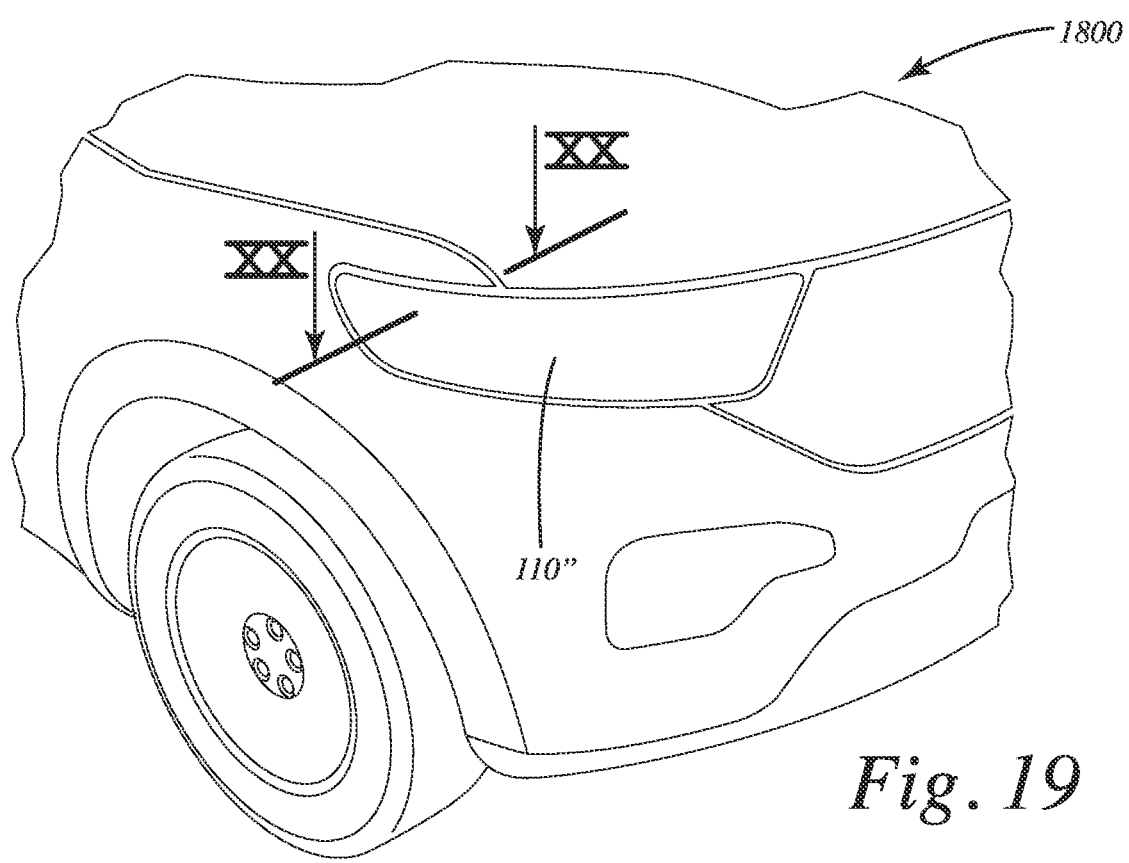
FIG. 19 shows a lighting system in accordance with one embodiment.
Figure 20:
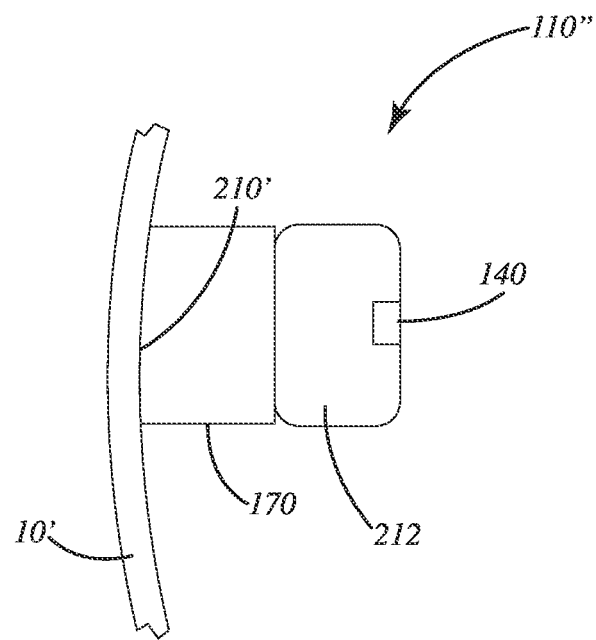
FIG. 20 shows a sectional view of FIG. 20.

In the illustrated embodiment of FIGS. 19-20, a lighting system for a vehicle head lamp is shown and generally designated 1800. The lighting system 1800 includes a light assembly 110" with a light element 140 and an optical translator 170 in accordance with one or more embodiments described herein. For instance, the light element 140 is capable of providing light, such as to operate as a vehicle head lamp. The optical translator 170 may be optically coupled to the light element 140 and to a vehicle lens 10' for output of light exterior to the vehicle. The vehicle lens 10' may be similar to the window 10 with transmissivity sufficient to provide output of light from the light element 140 exterior to the vehicle.

The optical translator 170 in the illustrated embodiment is optically coupled to the vehicle lens 10' via an interface 210' similar to the window interface 210 described herein. The optical translator 170 may be configured in accordance with any one or more embodiments described herein to facilitate transmission of light from the light element 140 to the vehicle lens 10' and exterior to the vehicle. For instance, the optical translator 170 may have a low durometer, enabling the optical translator 170 to at least partially conform to the shape of the vehicle lens 10'.

III. Optical Path Translator

Figure 7:
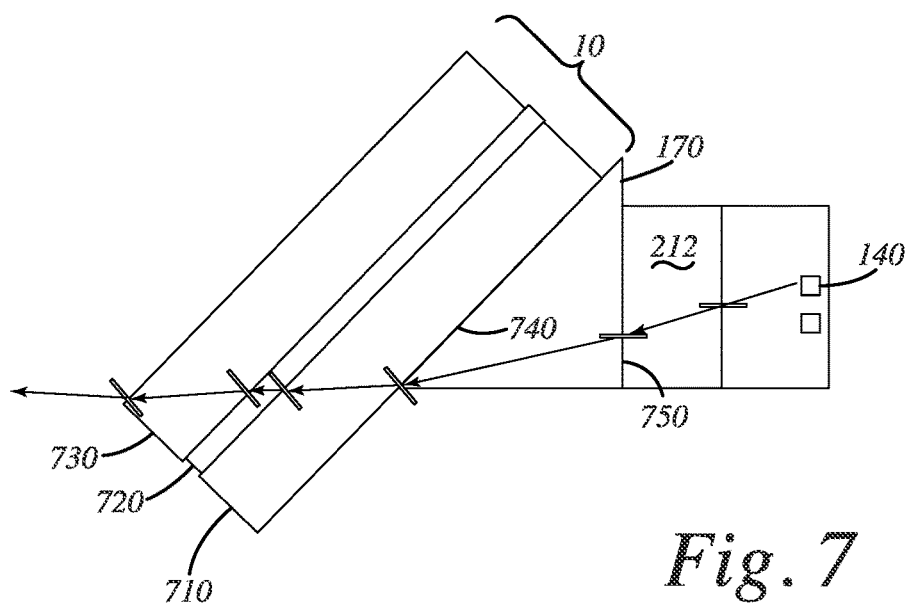
FIG. 7 depicts a side view of a light element and an optical path translator according to one embodiment.

The optical translator 170 in one embodiment is shown in FIG. 7. The optical translator 170 as depicted is a wedge of low durometer grade silicone. For example, the optical translator 170 may be made of a DOW low durometer optical grade silicone, such as less than 15 Shore A. The optical translator 170 can be a variety of shapes, which may include curves and be generally triangular in cross-section. Alternatively, the optical translator 170 may include flat parallel surfaces and be generally rectangular in cross-section. The optical translator 170 is sized to be disposed between a lens 212 (or optionally the light element 140) and the window 10 for lights oriented with the light assembly pointed up, down, or laterally while still providing the final translated light directly out the glass regardless of the angle of the window 10 at the desired lighting location on a vehicle. In one embodiment, the optical translator 170 is attached to the light assembly 110 via a molding process or another suitable optical bonding process. The optical translator 170 has an interface 740 located on the portion of the optical translator 170 in contact with the window 10 and a light element interface 750 located on the portion of the optical translator 170 in contact with the light element 140.

The lens 212 in the illustrated embodiment is formed of silicone; however, it is to be understood that the lens 212 may be formed of one or more different or additional materials. The type of silicone of the lens 212 may be different from the type of silicone that forms the optical translator 170.

Car windows, such as the windshield, are often laminated safety glass. A popular resin for creating laminated safety glass is polyvinyl butyral (PVB). In the illustrated embodiment, the window 10 is laminated safety glass and comprises three layers. The layer in contact with the optical translator 170 is the inner glass layer 710 which is in contact with the PVB layer 720 on its opposite side. The PVB layer 720 in turn is in contact with the outer glass layer 730 on its opposite side. Silicone, glass, PVB, and air all have different refractive indexes n which affect the amount of light emitted from the light element 140 that is reflected off the window 10 and into the cabin of the vehicle.

It is noted that without the optical translator 170 in place, the light may travel from the light element 140 through the lens 212 and optical translator 170 but not passing through air or so that reflection and/or refraction is reduced or eliminated, yielding greater efficiency.

Silicone has an n of 1.42, glass has an n of 1.518, PVB has an n of 1.485, and air has an n of 1.003. Without the optical translator 170 between the light element 140 and the lens 212 and the window 10, the space between the light element 140 and the window 10 is air. As a result, there can be a significant difference between the refractive index of the light emitted from the light element 140 as it passes through the air and the refractive index of the emitted light as the light interfaces with the inner glass layer 710 of the window 10. As the light goes from the air into the window 10, the high angle of incidence can create another loss, known as the specular component or Fresnel Reflection. The higher the angle of incidence to normal, reflection (instead of transmissivity) increases logarithmically. The Brewster angle defines a specific incident I angle θ in which the reflected R becomes nominal, in particular a P-polarized component of I. The reflected light component R is lost and/or absorbed by conventional light assembly housings. These conventional housings include a mechanical component, which attempts to create a light leakage prevention barrier, as the bright light leakage is a possible distraction to the driver of the vehicle.

Figure 18:
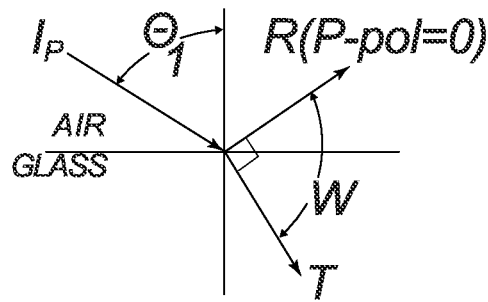
FIG. 18 shows a configuration in accordance with one embodiment of the present disclosure.
Figure 18:
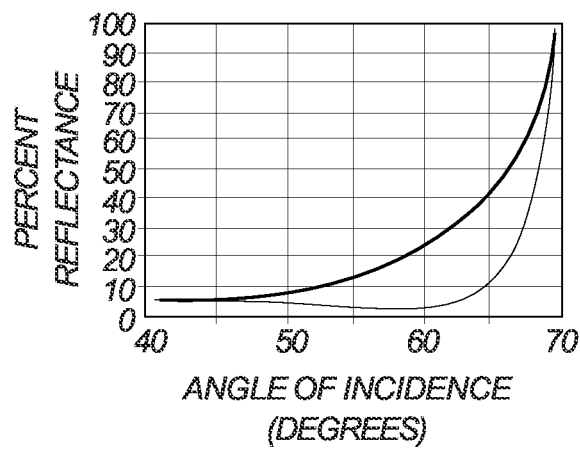
Figure 18:
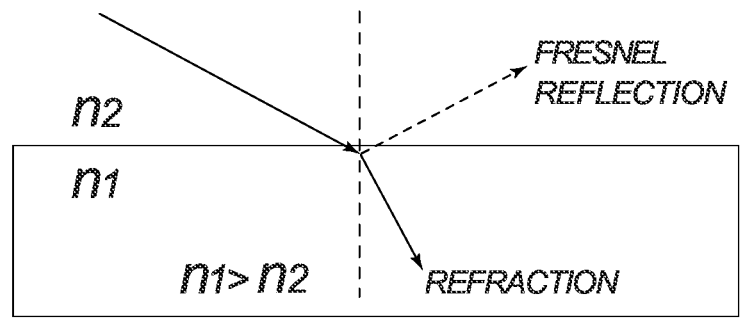
Figure 18:
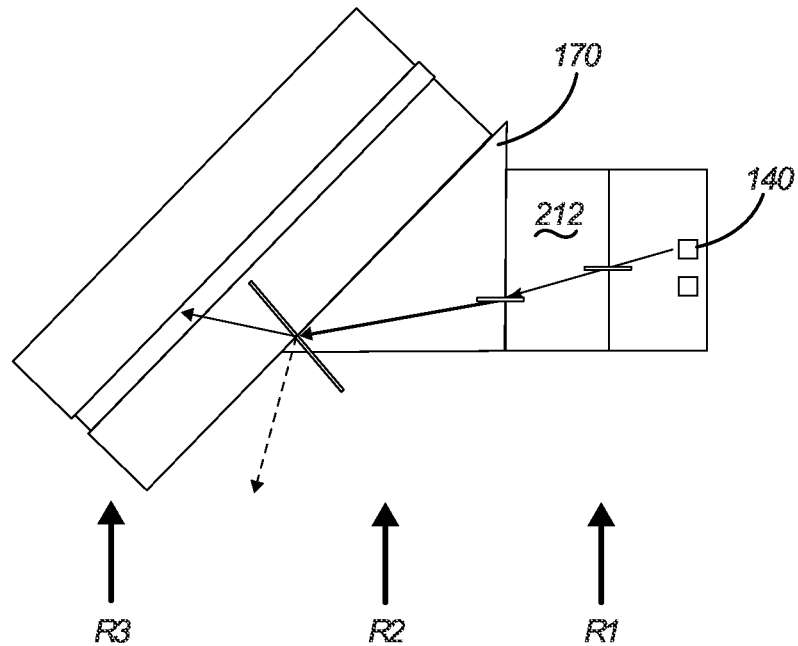

As depicted in the illustrated embodiment of FIG. 18, the Brewster angle is shown in further detail, light emanating from a region R1. As a light ray goes from region R2 into glass component R3, the high angle of incidence creates another loss—the specular component or Fresnel Reflection. This principal shows the higher the angle of incidence to normal, reflection (instead of the greater transmissivity) increases logarithmically. The Brewster angle defines a specific incident I angle ⊕ in which the reflected R becomes nominal, in particular a P-polarized component of I.

The reflected light component R can be lost or absorbed in a lighting assembly housing, which is a mechanical component that may be provided to create a light leakage prevention barrier.

As the Brewster angle describes an angle of incidence whereby polarized components of light reflect or transmit through the medium, for example glass, one mechanism to enhance operation is the use of polarizing the light approaching the window 10. Polarizing elements may be linear or circular in orientation. Application of polarizing elements (e.g., methods include but are not limited to: secondary polarizing film, molded in features to the optical translator, etched features, and even printed features onto the surface of the optical translator) may be provided such that mostly non-Brewster limiting polarizing components or only the non-Brewster limiting polarizing component is present at the window interface, interior of the vehicle. In this case, the Brewster reflection may be reduced or minimized, relative to lighting signal system transversal from the source lighting element to vehicle exterior.

The optical translator 170 in accordance with one embodiment may be configured to avoid significant differences in refractive index with respect to light directed from the light element 140 through the window 10 and external to the vehicle. The optical translator 170 may be configured to optically couple the light element 140 to the window 10, potentially reducing or optimizing light loss due to scattering. It is noted that not all wavelengths of light refract at the same angle (e.g., red vs. blue wavelengths have different refractive angles). As a result, according to Snell's law, any interfaces with significant refractive index differential can amplify a visual difference as seen from the exterior of the vehicle. The optical translator 170 in one embodiment substantially reduces such amplification.

With the optical translator 170 in place, in one embodiment, there is a small difference in the refractive index of the different materials that the emitted light encounters. Silicone and glass are chemically similar with Silicone and Oxygen molecular composition, and because both materials may be index matched, diffraction is minimized at the boundaries of surface to surface transmissive light ray traversal. This allows the optical translator 170 to have a substantially seamless interface with the window 10. The similarity in refractive index and the substantially seamless interface allow for the light emitted from the light element 140 to travel out the window 10 with less impact on the path of the light. As can be seen in the illustrated embodiment of FIG. 7, the path of the light output from the light element 140 is substantially unaffected by the interfaces 740, 750 of the optical translator 170.

In one embodiment, the interface 740 may have a pattern. The pattern may be decorative, informational, or functional. The light element interface 750 may have a pattern which may be decorative, informational, or functional. A decorative pattern may be a solid or halftone pattern. This pattern may be additive (printed on the surface of the optical translator 170) or additive/subtractive (texture in the surface of the optical translator 170). For example, an informational pattern or texture may be text such as "Police" or a car brand name, a logo, or other optical effects. A functional pattern affects how the light emitted from the light element 140 is perceived outside of the vehicle. The illuminated interface 740 (e.g., an illuminated surface) may scatter light at texture or engraving locations in a different manner relative to another portion of the interface 740 where texture or engraving is absent. Another option is for interface 740 to include a decorative patterns or features.

The optical translator 170 may have molded elements for tint and/or spectral output modification. For example, the molded elements may be virgin raw material clear, or contain additives in the mix for a blended molded part including evenly suspended particles that attenuate light ray traversal through the optical translator 170. The optical translator 170 may include features to hold or mount additional optical components or electronic sensors within the same accessory component. For example, additional optical components or electronic sensors may include sensors to determine day/night, oncoming night time traffic headlights, traffic signaling, other vehicles equipped with signal lighting, or to assist with synchronization of signal lighting with visual light from a source external to the vehicle, or a combination thereof.

In the illustrated embodiment of FIGS. 8A and 8B, a top view of an interior mounted light in accordance with one embodiment is shown. The lighting system 100 in the illustrated embodiment includes first and second light assemblies 110, configured to share an optical translator 170, disposed in a cover 160 (e.g., a housing).

As can be seen, the optical translator 170 may conform to the shape or curvature of the window 10. For instance, the distance D1 and the distance D3 for the optical translator 170 in the illustrated embodiment of FIG. 8A are different respectively from the distance D1 and the distance D3 for the optical translator 170 in the illustrated embodiment of FIG. 8B.

In one embodiment, the optical translator 170 may be custom shaped to match the curvature of the window 10. Additionally, or alternatively, the optical translator 170 may be based on a low durometer material (e.g., less than 15 on the Shore A scale), which may conform to the curvature of the window 10 under a compressive force. The compressive force is provided by way of the support 150 attached to the light attachment 120, which is in turn attached to the window 10. This way, a consistent light interface can be provided for the light element 140 by the optical translator 170.

In the illustrated embodiment, one continuous optical translator 170 is provided that contacts the window 10 and a plurality of light elements 140. The depicted embodiment includes two light elements 140 (more or fewer may be provided) which are removably attached to the support 150.

The two light attachments 120 are shown interfaced with the window 10 and removably attached to the support 150. In an alternative embodiment, the light attachments 120 and the support 150 are directly integrated as one single piece. Each light attachment 120 may be secured to the support 150 by a retainer 310. The support 150 is optionally surrounded by the cover 160 which is interfaced with the window 10. The cover 160 in one embodiment is made at least substantially with black silicone. The cover 160 may substantially block leakage of light from the light assembly 110 into the vehicle cabin. The cover 160 in one embodiment includes opaque and adaptive seals. The cover 160 may snap on or otherwise attach to the support 150, the light elements 140, and/or the light attachments 120. The installation of the light assembly 110 in one embodiment does not require removal of the headliner of the vehicle.

Figure 9:
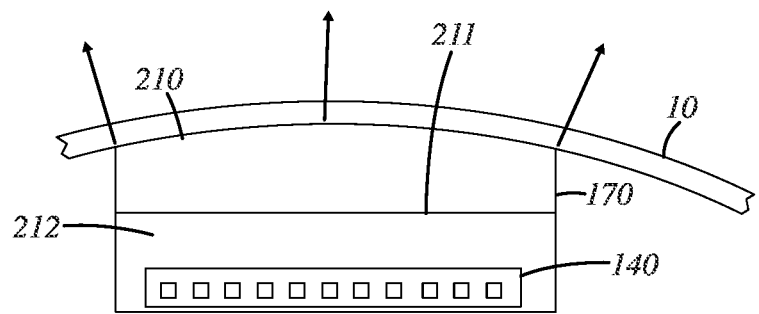
FIG. 9 depicts a top view of a light element and an optical path translator according to one embodiment.

With reference to FIG. 9, a top view of an embodiment of the optical translator 170 and the light element 140 is shown. In the illustrated embodiment, the light element 140 is one continuous light module. The optical translator 170 may be connected on one side to the light element 140 and on the opposite side to the window 10. The optical translator 170 is one piece of very low durometer grade silicone (e.g., less than 15 Shore A). The optical translator 170 may substantially conform to the curvature of the window 10. The optical translator 170 may include a window interface 210 for the window 10 and a light interface 211 for the light element 140 or a lens 212. The optical translator 170 may be molded by liquid injection molding. In one embodiment, the optical translator 170 may be a multi-part molded element including an optical transmissive part and an optically opaque part. For instance, with respect to the light element, the optical translator 170 may provide an optical path through the window 10. On the other hand, with respect to sides of the optical translator 170 other than those corresponding to the light interface 211 and the window interface 210, these sides may be formed of optically opaque material in an effort to prevent leakage of light from the optical translator 170 into the vehicle cab.

A functional pattern of the optical translator 170 in accordance with one embodiment may include one or more optical apertures 610 in alignment with light output from one or more light elements 140 which may have a higher durometer of 30 to 90 Shore A, relative to the hardness of the optical translator 170. A functional pattern may include molded-in optical guides for selective illumination control. For example, the optical guides may be made of silicone or plastic, primarily using the principle of Total Internal Reflection (TIR) to be an efficient conduit of light energy. A functional pattern may include integrated nano particles, fluorescers, photo excited particles, scattering components, pearlescence, mica, and/or opaquing elements. For example, a laser engraved mold tool for the optical translator 170 may provide custom information that is primarily visible when the light is on. Because optical silicone has a low viscosity (e.g., a liquid state) when molded, fine patterns are possible, including holographic and microscopic diffusing patterns. This pattern is functional because output from the light assembly 110, including the light element 140, can be transformed (e.g., for one or more custom effects or to facilitate use with different window configurations and/or vehicle configurations). A resulting functional pattern may include polarizing features and/or diffusing features. For example, a polarizing feature may be used for high angular glass mounting features to help account for optical physics like the Brewster angle, which defines the angle at which light is transmitted versus reflected, including it as a polarized component of the originating light source. This additional polarizing element may include in-molded, over-molded, or co-molded with film based optical structures.

Figure 10:
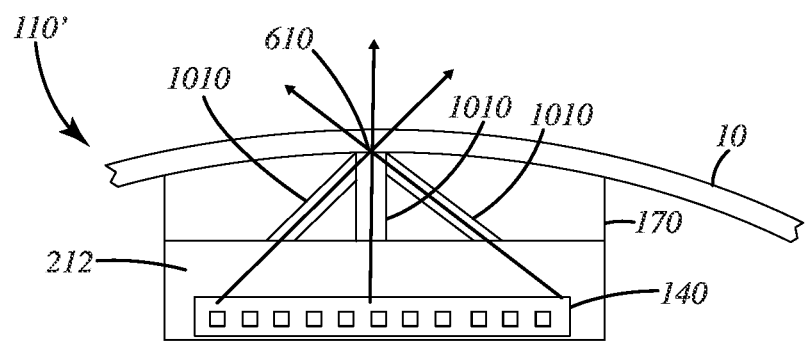
FIG. 10 depicts a top view, partial cross section view of a light element and an optical path translator according to one embodiment.
Figure 11:
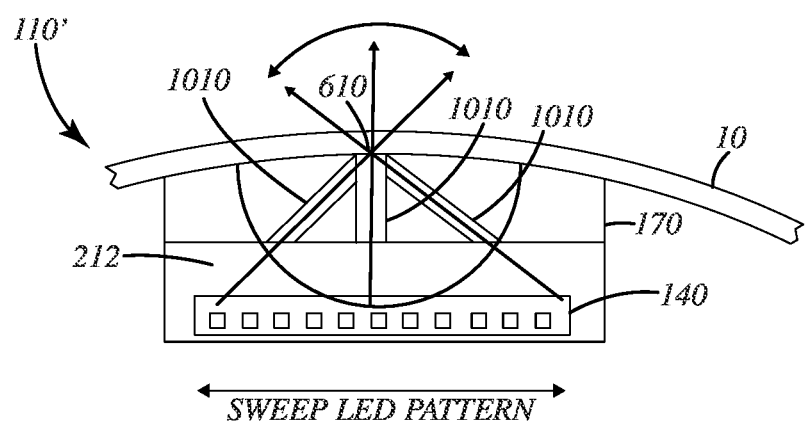
FIG. 11 depicts a top view of a light element and an optical path translator according to one embodiment.

With reference to the illustrated embodiments of FIGS. 10 and 11, an optical translator 170 that includes one or more optical apertures 610 is provided by a light assembly 110'. FIG. 10 depicts a top view of the light assembly 110' including an optical translator 170 and the light element 140. The light assembly 110' is considered highly concealed from the exterior of the vehicle in this configuration. For instance, concealment is achieved when the optical translator 170 is produced in a dark color because the lighting system is not conspicuous when viewed from outside the vehicle.

Although the light assembly 110' is described in conjunction with interfacing to a window 10, the present disclosure is not so limited. The light assembly 110'—indeed, any lighting assembly or system described herein—may provide a standalone light assembly that does not interface to a window 10 of a vehicle. The standalone light assembly may or may not include a standalone piece of glass or optical material in place of the window 10. For instance, in one embodiment, no standalone piece of glass or optical material may be present for the light assembly 110', and the light assembly 110' may be configured to generate light in accordance with one or more embodiments described herein. In configurations without a standalone piece of glass or optical material, the optical translator 170 may be formed of silicone but may be configured differently from optical translator configurations described herein in that the optical translator 170 in this configuration may be higher in durometer and constructed to avoid wetting, at the interface 210, to external objects. The standalone light assembly in one embodiment may also be configured without the attachment interface 130.

In the illustrated embodiment, the light element 140 is one continuous light module but it could alternatively be an array of distinct light modules. The optical translator 170 may be coupled on one side to the light element 140 (or a lens 212) and on the other side to the window 10.

The optical translator 170 may include a plurality of optical channels 1010 embedded within the optical translator 170. The optical channels 1010 may guide light emitted from the light element 140 toward one or more optical apertures 610 and the window 10. In the illustrated embodiment, the optical channels 1010 within the optical translator 170 may receive multiple inputs on the side facing the light element 140 and emit a focused light output through the optical aperture 610 toward the window 10. In this configuration, the emitted light may appear from a smaller area or larger area than the light element 140. In alternative embodiments, there may be multiple individual or single optical channels 1010 per light element 140. In one embodiment, the optical translator 170 may be constructed from a mostly opaque black material, with the optical tubes 1010 being light transmissive and providing efficient coupling (e.g., the optical guides may be made of silicone or plastic or glass, primarily using the principle of Total Internal Reflection (TIR) to be an efficient conduit of light energy) between the light element 140 and the window 10. In an alternative embodiment, the optical translator 170 is hollow where the interior of the optical translator 170 provides substantial reflective properties for the light assembly 110'.

With reference to FIG. 11, a top view of an embodiment of the optical translator 170 and the light element 140 is shown in conjunction with a light assembly 110'. The light element 14 may include an array of light-emitting diodes (LEDs). In one operation, the light element 140 can sweep linearly with the LED array in an on/off pattern, which can be used to provide a pivoting appearance from the exterior of the vehicle. For example, the light may appear to have the bulk of its energy go back and forth across the same plane as the LEDs. In an alternative operation, a two-dimensional LED array can produce a rotating and/or pivoting appearance through programming—a rotary off axis image not limited to a single plane. For example, a rotary off axis image may appear to orbit about the optical aperture 610 in a non-planar rotating conical light beam. The array of light-emitting diodes may be varied to yield a variety of changing patterns, including changes in color, rate, and intensity, or any combination thereof. The LEDs in light element 140 may be positioned on a planar circuit board or a non-planar arrangement such that the optical path distance of each optical channel 1010 is equal, as measured from each LED position to position of optical aperture 610.

Figure 12:
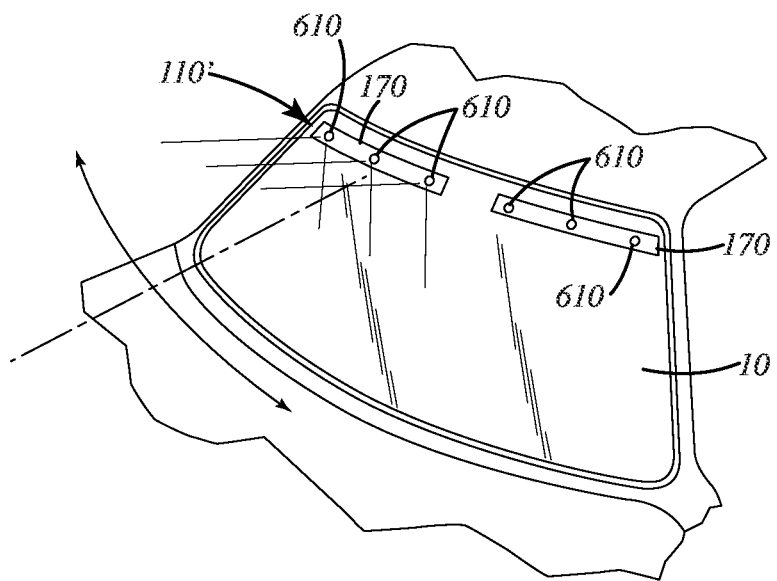
FIG. 12 depicts a front perspective view of a lighting system according to one embodiment as deployed in a vehicle.

In the illustrated embodiment of FIG. 12, the light assembly 110 of FIG. 11 is shown as installed in a vehicle from the exterior of the vehicle. The light assembly 110 is considered highly concealed in both daytime and nighttime vehicle usage. A plurality of optical apertures 610 are depicted that in conjunction with the optical channels 1010 transmitting the light emitted from light element(s) 140 directly to the window 10. The LED array of the light element 140 can be programmed to produce a rotating/pivoting appearance of the lights. For example, by guiding the light from multiple LEDs to culminate at a common location (e.g., an optical aperture 610) from different internal approach angles, the resulting exterior appearance can have a motion appearance while there are no actual moving parts. The overall shape of the optical translator 170 may be configured to function (possibly, in an optimal manner) with the angle of the glass of the window 10 or to be primarily perpendicular to the window 10. Other arrangements of a similarly functioning light element 140 include vertical stacking, multiple element groupings, and the linear arrangement as shown in the illustrated embodiment of FIG. 12.

Figure 21:
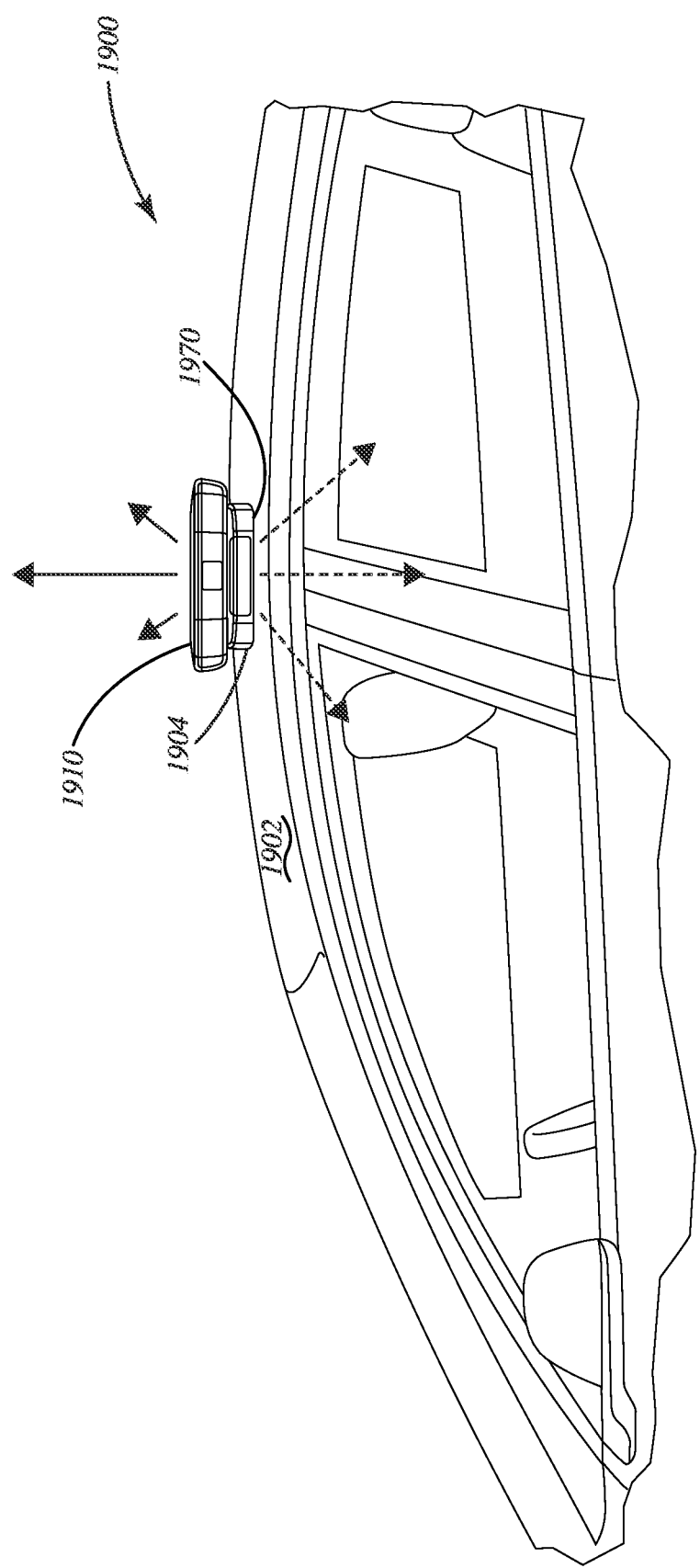
FIG. 21 shows a lighting system in accordance with one embodiment.
Figure 22:
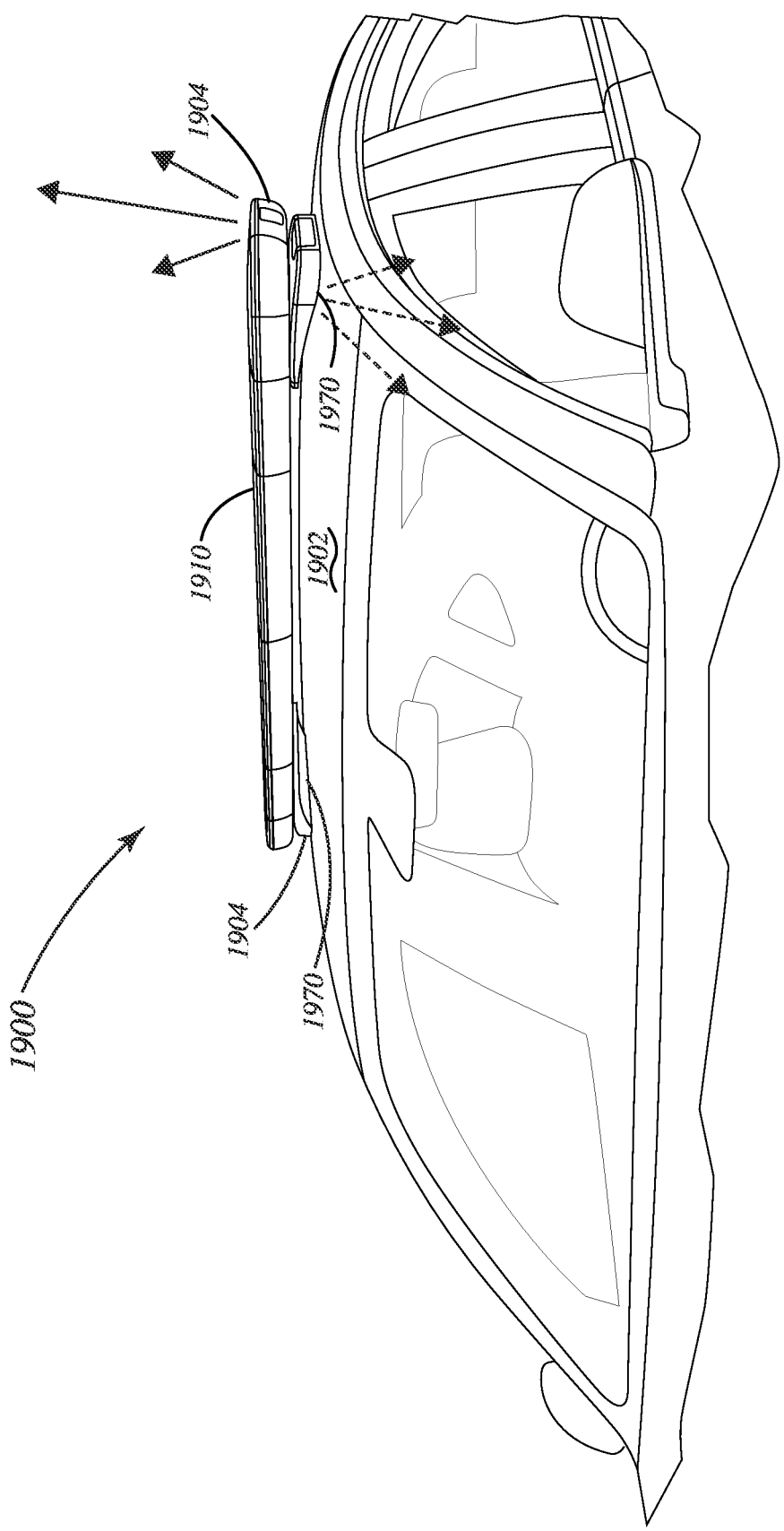
FIG. 22 shows an alternative view of the lighting system in FIG. 21.
Figure 23:
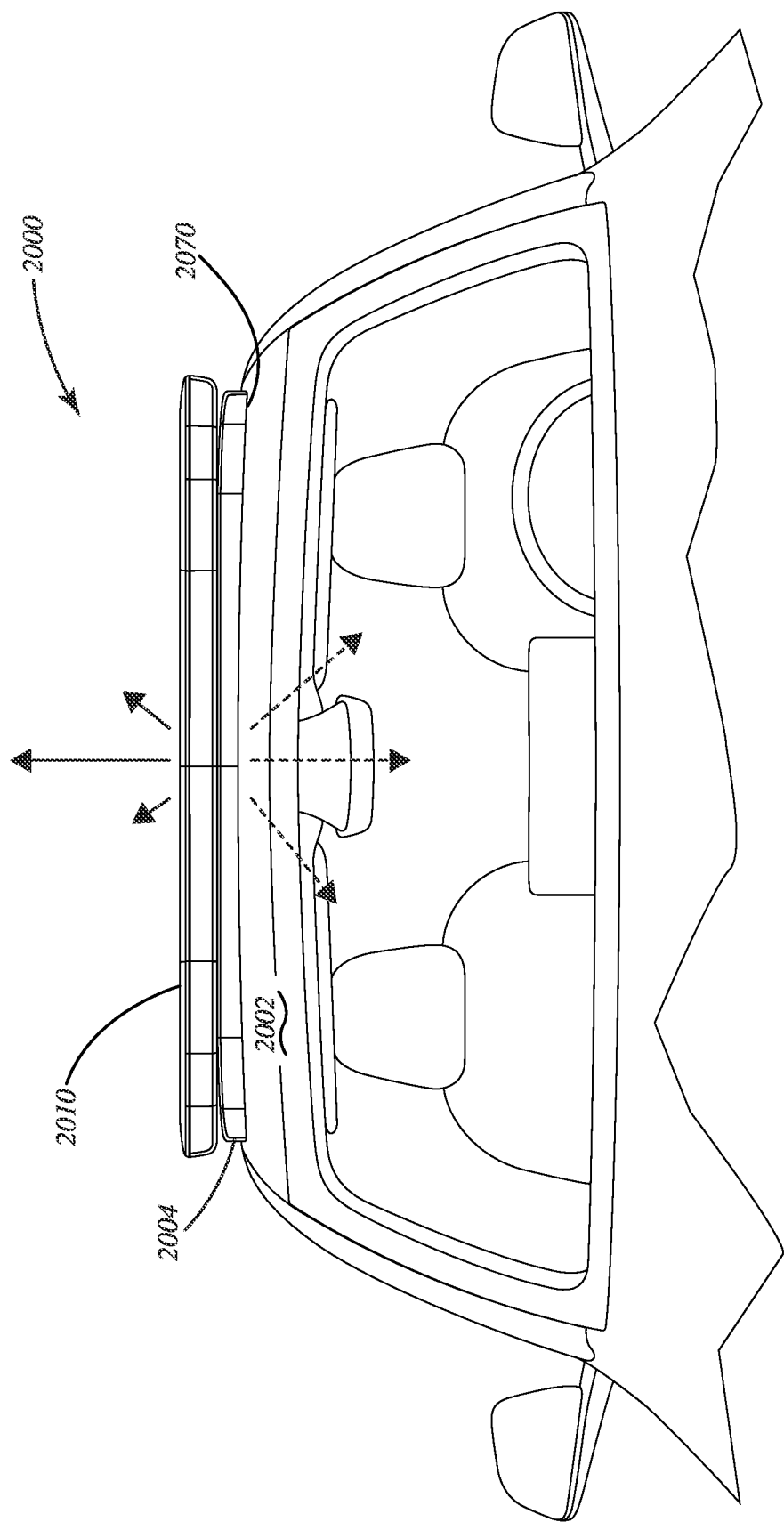
FIG. 23 shows a lighting system in accordance with one embodiment.

Turning to the illustrated embodiment of FIGS. 21-23, alternative lighting systems are depicted and generally designated 1900, 2000. The lighting systems 1900, 2000 may include light assemblies 1910, 2010 configured for external lighting configurations, such as external emergency vehicle configurations. The lighting systems 1900, 2000 may be similar to the lighting system 100, including, for example, light assemblies 1910, 2010 that may be similar to the light assembly 110. More specifically, the lighting systems 1900, 2000 may include optical translators 1970, 2070 that are similar in some respects to the optical translator 170.

In the illustrated embodiments, the light assemblies 1910, 2010 may be arranged to direct light both external and internal to the vehicle. Light from the light assembly 1910, 2010 may be directed internal to the vehicle via the optical translator 1970, 2070. For instance, in the illustrated embodiment of FIG. 21, an optical translator 1970 may be disposed between the structure of the vehicle and light sources of the light assembly 1910, which is disposed external to the vehicle. More specifically, first and second optical translators 1970 may be disposed between the light assembly 1910 and the vehicle roof 1902. Optionally, although not shown, the vehicle roof 1902 may include a plurality of light attachments, similar to the light attachment 120, and operable to couple the lighting system 1900 to the vehicle. The light attachments in an alternative configuration may be provided in the form of an adhesive mount that adheres to both the vehicle roof 1902 and supports 1904.

The first and second optical translators 1970 may be configured to optically couple the light assembly 1910 to the vehicle roof 1902 (e.g., an interface of the first and second optical translators 1970 may wet or optically couple to the vehicle roof 1902). The vehicle roof 1902 may include one or more apertures that facilitate transmission of light through the first and second optical translators 1970 into the vehicle cabin or interior of the vehicle. In one embodiment, the vehicle roof 1902 may be a glass roof.

Additional optical translator 1970 components may be included beyond the depiction of FIG. 22. For instance, the optical translator interface to the vehicle structure may include illumination features that may be used where the structure 1902 is non-opaque roof structure. The translator may indicate operational status, interior task lighting, commercial branding and logos, or end user customized text or graphical depictions. In this example, a non-opaque roof structure such as glass, may be considered a window 10.

In the illustrated embodiment of FIG. 23, the lighting system 2000 includes a single support 2004 that spans across the vehicle roof 2002 and supports the light assembly 2010. Similar to the lighting system 1900, an optical translator 2070 may be disposed between the structure of the vehicle and light sources of the light assembly 2010, which is disposed external to the vehicle. Optionally, although not shown, the vehicle roof 2002 may include a plurality of light attachments, similar to the light attachment 120, and operable to couple the lighting system 2000 to the vehicle. The light attachments in an alternative configuration may be provided in the form of an adhesive mount that adheres to both the vehicle roof 2002 and supports 2004.

The optical translator 2070 may be configured to optically couple the light assembly 2010 to the vehicle roof (e.g., an interface of the optical translators 2070 may wet or optically couple to the vehicle roof 2002). The vehicle roof 2002 may include one or apertures that facilitate transmission of light through the optical translators 2070 into the vehicle cabin or interior of the vehicle. One advantage of a full width optical translator is the potential elimination of aerodynamic voids between the vehicle roof and light assembly 2010. This has beneficial fuel and range economy, may avoid wind turbulence, and may reduce noise heard by the driver.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A lighting system for mounting a light assembly to a window of a vehicle, the lighting system comprising:
    a lighting attachment separable from the light assembly, the lighting attachment operable to attach to the window, the lighting attachment having a light assembly interface that facilitates installation of the light assembly on a portion of the vehicle;
    the light assembly configured to connect with the light assembly interface of the lighting attachment, the light assembly having a light element that generates light in response to application of power to the light element; and
    an optical translator disposable between the light assembly and the window of the vehicle, the optical translator being in optical communication with the light element such that light from the light element is transmitted through the optical translator, the optical translator having a window interface configured to contact the window of the vehicle.

2. The lighting system of claim 1 wherein the window interface of the optical translator is operable to wet to the window of the vehicle such that the optical translator conforms to the surface of the window.

3. The lighting system of claim 1 wherein the optical translator is a silicone-based optical element disposable in contact with the light assembly and the window of the vehicle.

4. The lighting system of claim 3 wherein the silicone-based optical element is configured to conform to an interior or exterior surface of the window.

5. The lighting system of claim 4 wherein the silicone-based optical element is configured to direct the light received from the light element to the window interface.

6. The lighting system of claim 1 wherein the optical translator is operable to affect at least a portion of the light that is output from the light element.

7. The lighting system of claim 6 wherein the optical translator is operable to affect at least one of an intensity and color of at least a portion of the light that is output from the light element.

8. The lighting system of claim 6 wherein the optical translator includes an optical element configured to affect light received from the light element.

9. The lighting system of claim 8 wherein the optical element is an optical aperture aligned with a light source of the light element.

10. The lighting system of claim 8 wherein the optical element is texture of a surface of the optical translator that affects the light received from the light element.

11. The lighting system of claim 1 comprising one or more sensors to sense an environmental characteristic of the lighting system.

12. The lighting system of claim 1 comprising an integrated wire management system to house one or more wires of the lighting system.

13. The lighting system of claim 1 comprising a cover to conceal one or more components of the lighting system, wherein the cover is made from a soft material.

14. The lighting system of claim 13 wherein the cover comprises at least one thermal relief vent, wherein the at least one thermal relief vent provides a path for thermal energy to escape the cover without allowing light to substantially leak into an interior of the vehicle.

15. An optical translator for a lighting assembly of a vehicle, the lighting assembly having a light element, the optical translator comprising:
- an optical interface in optical communication with the light element of the lighting assembly;
- a window interface operable to conform to a surface of a window of the vehicle, wherein light received from the light element via the optical interface is directed to the window interface;
- an optical element configured to affect light received from the light element, wherein the optical element is an optical aperture,
- whereby the optical translator is disposable between the window and the lighting assembly; and
- wherein the light element comprises an array of lights and a sweep through the array of lights creates an apparent motion of an emitted light beam.

16. The optical translator of claim 15 wherein the optical translator is formed of a silicone-based material.

17. The optical translator of claim 15 wherein the window interface is configured to wet to the surface of the window.

18. The optical translator of claim 15 wherein the optical aperture is aligned with a light source of the light element.

19. The optical translator of claim 18 wherein the optical element is texture on or in the optical interface of the optical translator that affects light received from the light element.

20. The optical translator of claim 15 wherein the optical interface is at least partially in contact with the light element of the lighting assembly.

21. The optical translator of claim 15 wherein the optical translator is manufactured from a low durometer material, is compressible, and is formable to a curvature of the window of the vehicle and the lighting assembly without substantially affecting optical properties of the lighting assembly.

22. The optical translator of claim 15 wherein the light element of the lighting assembly is optically connected to the optical interface remotely through an optical extension component.

* * * * *